US011335919B2

(12) United States Patent
Brown et al.

(10) Patent No.: US 11,335,919 B2
(45) Date of Patent: May 17, 2022

(54) SELECTIVELY ROTATED FLOW FIELD FOR THERMAL MANAGEMENT IN A FUEL CELL STACK

(71) Applicant: Versa Power Systems Ltd, Danbury, CT (US)

(72) Inventors: Casy Cloudless Brown, Calgary (CA); Khun Bong Luc, Calgary (CA)

(73) Assignee: Versa Power Systems Ltd, Danbury, CT (US)

( * ) Notice: Subject to any disclaimer, the term of this patent is extended or adjusted under 35 U.S.C. 154(b) by 224 days.

(21) Appl. No.: 16/721,393

(22) Filed: Dec. 19, 2019

(65) Prior Publication Data

US 2020/0127304 A1    Apr. 23, 2020

Related U.S. Application Data

(63) Continuation of application No. PCT/IB2018/054830, filed on Jun. 28, 2018.
(Continued)

(51) Int. Cl.
*H01M 8/0258* (2016.01)
*H01M 8/04007* (2016.01)
(Continued)

(52) U.S. Cl.
CPC ..... *H01M 8/0258* (2013.01); *H01M 8/04074* (2013.01); *H01M 8/2425* (2013.01);
(Continued)

(58) Field of Classification Search
None
See application file for complete search history.

(56) References Cited

U.S. PATENT DOCUMENTS 6,344,290 B1 * 2/2002 Bossel ............... H01M 8/2432
429/456
6,500,578 B1   12/2002 Ong et al.
(Continued)

FOREIGN PATENT DOCUMENTS

CN      204118191 U    1/2015
JP      03-129675 A    6/1991
(Continued)

OTHER PUBLICATIONS

International Search Report and Written Opinion in PCT/IB2018/054830 dated Sep. 19, 2018 (10 pages).

*Primary Examiner* — Jeremiah R Smith
(74) *Attorney, Agent, or Firm* — Foley & Lardner LLP

(57) ABSTRACT

An electrochemical cell stack comprises a plurality of electrochemical cell units, each comprising a cathode, an anode, and an electrolyte, and also comprises a plurality of interconnects. An interconnect is disposed between adjacent electrochemical cell units and defines a longitudinal channel having circumferential corrugations defined therearound. A fuel channel is defined between each anode and a respective adjacent interconnect, the fuel channel having fuel inlet and outlet. An oxidant channel is defined between each cathode and a respective adjacent interconnect, the oxidant channel having an oxidant inlet and outlet. The plurality of electrochemical cell units and interconnects include a first electrochemical cell unit, a first interconnect adjacent the first electrochemical cell unit, a second electrochemical cell unit adjacent the first interconnect, and a second interconnect adjacent the second electrochemical cell unit. The second interconnect is rotationally offset from the first interconnect about a longitudinal axis of the fuel cell stack.

16 Claims, 21 Drawing Sheets

Related U.S. Application Data

(60) Provisional application No. 62/526,683, filed on Jun. 29, 2017.

(51) Int. Cl.
  *H01M 8/2425* (2016.01)
  *H01M 8/2485* (2016.01)
  *H01M 8/12* (2016.01)
  *H01M 8/00* (2016.01)

(52) U.S. Cl.
  CPC .......... *H01M 8/2485* (2013.01); *H01M 8/004* (2013.01); *H01M 2008/1293* (2013.01); *Y02E 60/50* (2013.01)

(56) References Cited

U.S. PATENT DOCUMENTS

| | | | |
|---|---|---|---|
| 2001/0028973 | A1 | 10/2001 | Ong et al. |
| 2006/0166053 | A1* | 7/2006 | Badding ............. H01M 8/2432 429/429 |
| 2010/0015481 | A1* | 1/2010 | Kanao ................. H01M 8/0258 429/456 |
| 2010/0266924 | A1* | 10/2010 | Kaupert ............. H01M 8/0662 429/452 |
| 2012/0021324 | A1* | 1/2012 | Ogawa ................. H01M 8/248 429/457 |
| 2013/0078448 | A1* | 3/2013 | Tucker ................... C04B 38/02 428/319.1 |
| 2015/0349354 | A1* | 12/2015 | Fukuyama .......... H01M 8/0297 429/434 |

FOREIGN PATENT DOCUMENTS

| | | |
|---|---|---|
| JP | 07-211333 A | 8/1995 |
| JP | 2008-288080 A | 11/2008 |
| JP | 2009-123520 A | 6/2009 |
| WO | WO-2018/203285 | 11/2018 |

* cited by examiner

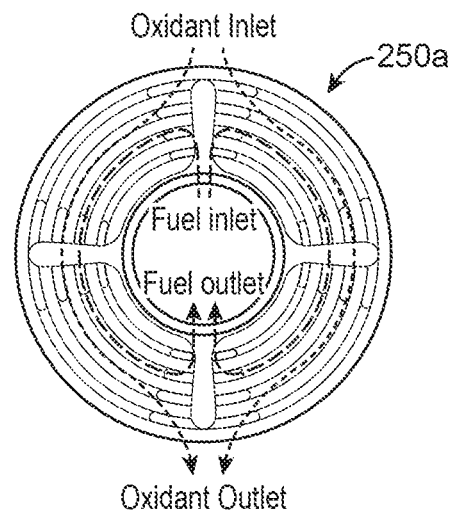
FIG. 2A — Single Inlet/Outlet
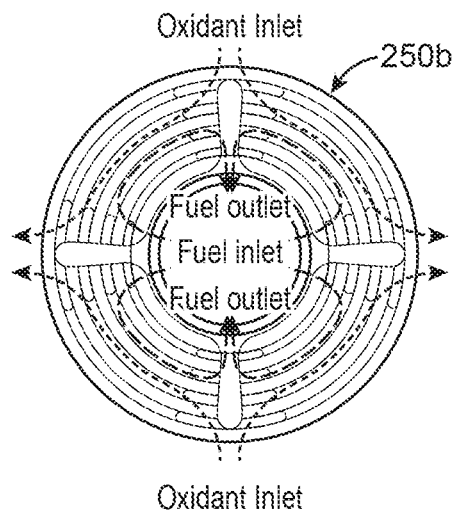
FIG. 2B — Dual Inlet/Outlet
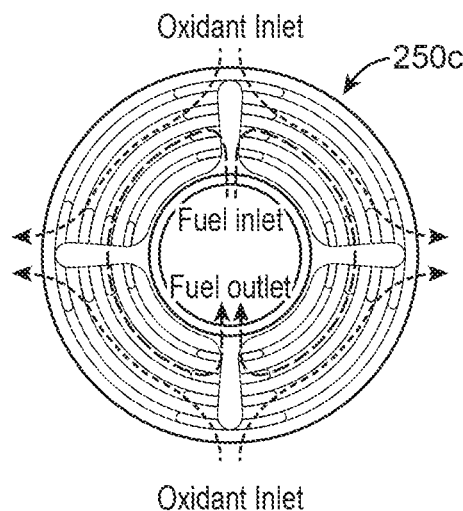
FIG. 2C — Dual Oxidant Inlet/Outlet Single Fuel Inlet/Outlet
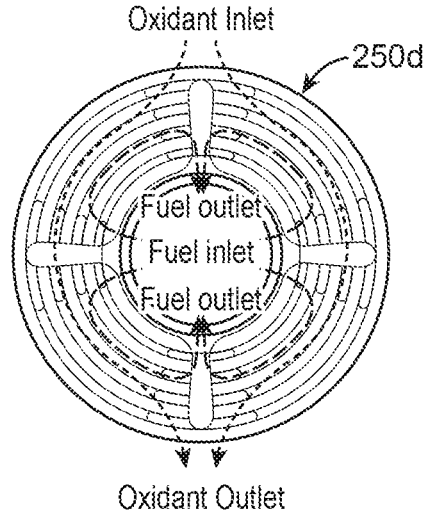
FIG. 2D — Dual Fuel Inlet/Outlet Single Oxidant Inlet/Outlet

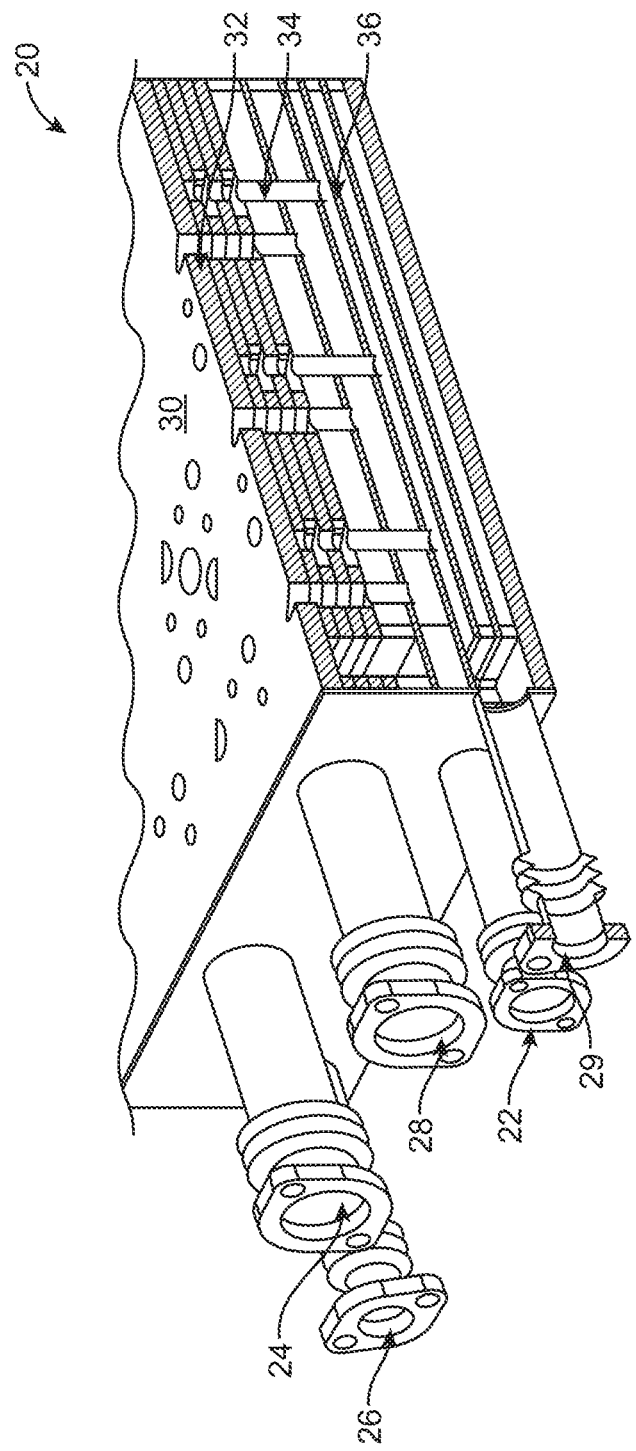

US 11,335,919 B2

SELECTIVELY ROTATED FLOW FIELD FOR THERMAL MANAGEMENT IN A FUEL CELL STACK

CROSS-REFERENCE TO RELATED APPLICATIONS

This application is a Continuation of International Application No. PCT/IB2018/054830, filed Jun. 28, 2018, which claims priority to and benefit of U.S. Provisional Patent Application No. 62/526,683, filed Jun. 29, 2017 and entitled "Selectively Rotated Flow Field for Thermal Management in a Fuel Cell Stack," the entire disclosures of which are incorporated herein by reference.

TECHNICAL FIELD

The present disclosure relates to high temperature fuel cell stacks and electrolysis stacks, and particularly to solid oxide (SOFC) and solid oxide electrolysis cell (SOEC) stacks, and more particularly, to high power density compact SOFC stacks that include thermal management.

BACKGROUND

Solid oxide fuel cells comprise an electrolyte sandwiched between a cathode and an anode. Oxygen reacts with electrons at the cathode to form oxygen ions, which are conducted through the ion-conducting ceramic electrolyte to the anode. At the anode, oxygen ions combine with available fuel (e.g., hydrogen and carbon monoxide) to form products (e.g.: water and carbon dioxide) thereby liberating electrons to produce electrical power. The technology can equally be run in reverse to form fuel gases and oxygen when supplied with appropriate reactants (e.g., water and carbon dioxide) and electrical power. In this case the technology is termed a solid oxide electrolysis cell. SOFC development has seen a multitude of approaches (anode, cathode or electrolyte supported, monolithic ceramic vs metallic interconnects, planar vs tubular and variants thereof). The prime challenge to commercialize the technology has been the simultaneous achievement of marketable price, reasonable performance, and useful lifetime. These drivers are closely related.

SUMMARY

International Patent Application No. PCT/IB2018/053099, filed on May 4, 2018, which claims priority to U.S. Provisional Application No. 62/501,633, filed on May 4, 2017 by the present Applicant, describes a fuel cell stack having hermetically sealed fuel cell units. The fuel cell stack includes a plurality of solid oxide fuel cells alternating with a plurality of interconnects. Each fuel cell includes a cathode, an electrolyte, an anode, and optionally an anode support. The fuel cells and interconnects are shaped such that, when the stack is formed, a longitudinal channel extends longitudinally through the fuel cell stack. In some embodiments, the fuel cells and interconnects have an annular shape, and the longitudinal channel is a central channel located at an axial center of the stack. International Patent Application No. PCT/IB2018/053099 ("the '099 application") is hereby incorporated by reference in its entirety, including with respect to its disclosure regarding embodiments of the above-mentioned fuel cell stack Embodiments described herein relate generally to electrochemical cell stacks configured for thermal management, and in particular, to electrochemical cell stacks that include an interconnect disposed between each of a plurality of electrochemical cell units of the electrochemical cell stack. Each interconnect is rotationally offset with respect to an adjacent interconnect so as to spread oxidant inlet endotherms across a larger percentage of the electrochemical cell area and reduce temperature difference across the plurality of electrochemical cell units.

In some embodiments, an electrochemical cell stack comprises a plurality of electrochemical cell units, each comprising a cathode, an anode, and an electrolyte disposed between the cathode and the anode. The electrochemical cell stack also comprises a plurality of interconnects, each interconnect being disposed between adjacent fuel cell units, each of the plurality of interconnects comprising an interconnect main body defining a longitudinal channel along a longitudinal axis thereof, and a plurality of corrugations defined circumferentially around the longitudinal channel. A fuel channel is defined between each anode and a respective adjacent interconnect, the fuel channel having a fuel inlet and a fuel outlet. An oxidant channel is defined between each cathode and a respective adjacent interconnect, the oxidant channel having an oxidant inlet and an oxidant outlet. The plurality of electrochemical cell units and interconnects include a first fuel cell unit, a first interconnect adjacent the first fuel cell unit, a second fuel cell unit adjacent the first interconnect, and a second interconnect adjacent the second fuel cell unit. The second interconnect is rotationally offset from the first interconnect about a longitudinal axis of the fuel cell stack.

In some embodiments, the second interconnect is rotationally offset from the first interconnect by an angle in a range of 10 degrees to 170 degrees. In particular embodiments, the second interconnect is rotationally offset from the first interconnect by an angle of 60 degrees. In some embodiments, each interconnect of the plurality of interconnects is rotationally offset from an adjacent interconnect by an angle of 10 degrees to 60 degrees. In some embodiments, each of the plurality of interconnects comprises a fuel inlet channel fluidly coupled to the fuel inlet, the fuel inlet channel being located across an arc segment of the electrochemical cell unit that inscribes a first angle in a range of about 2 degrees to 10 degrees. In particular embodiments, the first angle is about 5 degrees. In some embodiments, each of the plurality of interconnects comprises an oxidant inlet channel fluidly coupled to the oxidant inlet, the oxidant inlet channel being located across an arc segment of the electrochemical cell unit that inscribes a second angle in a range of about 15 degrees to 30 degrees. In particular embodiments, the second angle is about 20 degrees. In some embodiment, each of the plurality of interconnects are rotationally offset along the longitudinal axis in a rotational pattern, the rotational pattern repeating after every group of two to ten interconnects.

In some embodiments, the plurality of corrugations define a plurality of fuel channels on a first surface of the interconnect main body facing the first electrochemical cell unit, and a plurality of oxidant channels on a second surface of the interconnect main body facing the second electrochemical cell unit, each of the plurality of fuel channels and the plurality of oxidant channels being positioned around the longitudinal channel. In some embodiments, a fuel channel base of each of the plurality of fuel channels electrically contacts an anode of a corresponding second electrochemical cell unit, and an oxidant channel base of each of the plurality of oxidant channels electrically contacts a cathode of a corresponding first electrochemical cell unit. In some embodiments, each of the plurality of interconnects comprises a fuel inlet channel, a fuel outlet channel, an oxidant inlet channel and an oxidant outlet channel, each of the fuel inlet channel and fuel outlet channel being fluidly coupled to each of the plurality of fuel channels of a corresponding interconnect of the plurality of interconnects, and each of the oxidant inlet channel and oxidant outlet channel being fluidly coupled to each of the plurality of oxidant channels of a corresponding interconnect of the plurality of interconnects.

In another embodiment, a fuel cell stack comprises a plurality of fuel cell units, each comprising a cathode, an anode, and an electrolyte disposed between the cathode and the anode. The fuel cell stack also comprises a plurality of interconnects, each interconnect being disposed between adjacent fuel cell units. A fuel channel is defined between each anode and a respective adjacent interconnect, the fuel channel having a fuel inlet channel and a fuel outlet channel. An oxidant channel is defined between each cathode and a respective adjacent interconnect, the oxidant channel having an oxidant inlet channel and an oxidant outlet channel. The plurality of fuel cell units and interconnects include a first fuel cell unit, a first interconnect adjacent the first fuel cell unit, a second fuel cell unit adjacent the first interconnect, and a second interconnect adjacent the second fuel cell unit. A fuel inlet channel corresponding to the second fuel cell unit is rotationally offset from a fuel inlet channel corresponding to the first fuel cell unit about a longitudinal axis of the fuel cell stack. Each of the plurality of interconnects comprise an interconnect main body defining a longitudinal channel along a longitudinal axis thereof, and a plurality of corrugations defined circumferentially around the longitudinal channel.

In some embodiments, the second interconnect is rotationally offset from the first interconnect by an angle in a range of 10 degrees to 170 degrees. In some embodiments, the second interconnect is rotationally offset from the first interconnect by an angle of about 60 degrees. In some embodiments, the plurality of corrugations define a plurality of fuel channels on a first surface of the interconnect main body facing the first electrochemical cell unit, and a plurality of oxidant channels on a second surface of the interconnect main body facing the second electrochemical cell unit, each of the plurality of fuel channels and the plurality of oxidant channels being positioned around the longitudinal channel.

In another embodiment, a fuel cell stack comprises a plurality of fuel cell units, each comprising a cathode, an anode, and an electrolyte disposed between the cathode and the anode. The fuel cell stack also comprises a plurality of interconnects, each interconnect being disposed between adjacent fuel cell units, the plurality of interconnects cooperatively forming a bellows like structure such that the fuel cell stack has compliance. A fuel channel is defined between each anode and a respective adjacent interconnect, the fuel channel having a fuel inlet channel and a fuel outlet channel. An oxidant channel is defined between each cathode and a respective adjacent interconnect, the oxidant channel having an oxidant inlet channel and an oxidant outlet channel. The plurality of fuel cell units and interconnects include a first fuel cell unit, a first interconnect adjacent the first fuel cell unit, a second fuel cell unit adjacent the first interconnect, and a second interconnect adjacent the second fuel cell unit. An oxidant inlet channel corresponding to the second fuel cell unit is rotationally offset from an oxidant inlet channel corresponding to the first fuel cell unit about a longitudinal axis of the fuel cell stack.

In some embodiments, the second interconnect is rotationally offset from the first interconnect by an angle in a range of 10 degrees to 170 degrees. In some embodiments, each of the plurality of interconnects comprise an interconnect main body defining a longitudinal channel along a longitudinal axis thereof, and a plurality of corrugations defined circumferentially around the longitudinal channel, wherein the plurality of corrugations define a plurality of fuel channels on a first surface of the interconnect main body facing the first electrochemical cell unit, and a plurality of oxidant channels on a second surface of the interconnect main body facing the second electrochemical cell unit, each of the plurality of fuel channels and the plurality of oxidant channels being positioned around the longitudinal channel.

The foregoing is a summary of the disclosure and thus by necessity contains simplifications, generalizations, and omissions of detail. Consequently, those skilled in the art will appreciate that the summary is illustrative only and is not intended to be in any way limiting. Other aspects, features, and advantages of the devices and/or processes described herein, as defined by the claims, will become apparent in the detailed description set forth herein and taken in conjunction with the accompanying drawings.

BRIEF DESCRIPTION OF THE DRAWINGS

The foregoing and other features of the present disclosure will become more fully apparent from the following description and appended claims taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

FIGS. 2A-2D are top schematic views of a fuel cell unit according to some embodiments, each showing different possible flow paths of fuel and oxidant gas, based on different combinations of internal and external manifold designs. FIG. 2A depicts a fuel cell unit with a single fuel inlet, a single fuel outlet, a single oxidant inlet, and a single oxidant outlet. FIG. 2B depicts a fuel cell unit with two fuel inlets, two fuel outlets, two oxidant inlets, and two oxidant outlets. FIG. 2C depicts a fuel cell unit with a single fuel inlet, a single fuel outlet, two oxidant inlets, and two oxidant outlets. FIG. 2D depicts a fuel cell unit with two fuel inlets, two fuel outlets, a single oxidant inlet and single oxidant outlet.

FIGS. 5A and 5B are perspective views of a base portion of the arrays shown in FIGS. 4A and 4B, showing the fuel and oxidant inlets and outlets of the array.

FIG. 7A shows a top, fuel side of the interconnect. FIG. 7B shows a bottom, oxidant side of the interconnect.

FIGS. 12A-12E show each fuel cell unit individually, and FIG. 12F is a cutaway perspective view showing the fuel inlet half of all five of the interconnects of FIGS. 12A-12E.

Figure 1A:
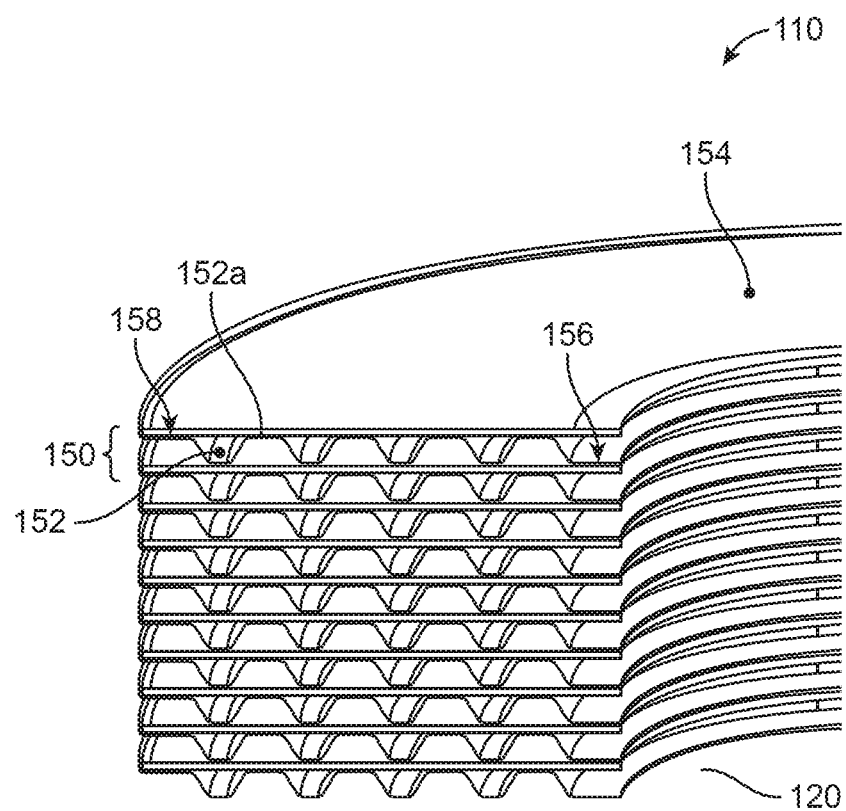
FIG. 1A is a cross-sectional perspective view of a portion of a fuel cell stack having hermetically sealed fuel cell units, according to an embodiment.

Reference is made to the accompanying drawings throughout the following detailed description. In the drawings, similar symbols typically identify similar components unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Embodiments described herein relate generally to electrochemical cell stacks configured for thermal management, and in particular, to electrochemical cell stacks that include an interconnect disposed between each of a plurality of electrochemical cell units of the electrochemical cell stack. Each interconnect is rotationally offset with respect to an adjacent interconnect so as to spread oxidant inlet endotherms across a larger percentage of the electrochemical cell area and reduce temperature difference across the plurality of electrochemical cell units.

In order to reduce electrochemical cell stack (also referred to herein as "stack") cost, a strategy of reducing the material content of the stack has been pursued. The resulting stack platforms, achieve a reduction in material content and in volume, per kW produced, as a cost savings strategy. However, this imposes relatively higher heat loads (heat per unit volume and unit mass) within the cell and stack and so requires new strategies for thermal management. FIGS. 1-10 show the stack designs described in the '099 application.

Figure 1B:
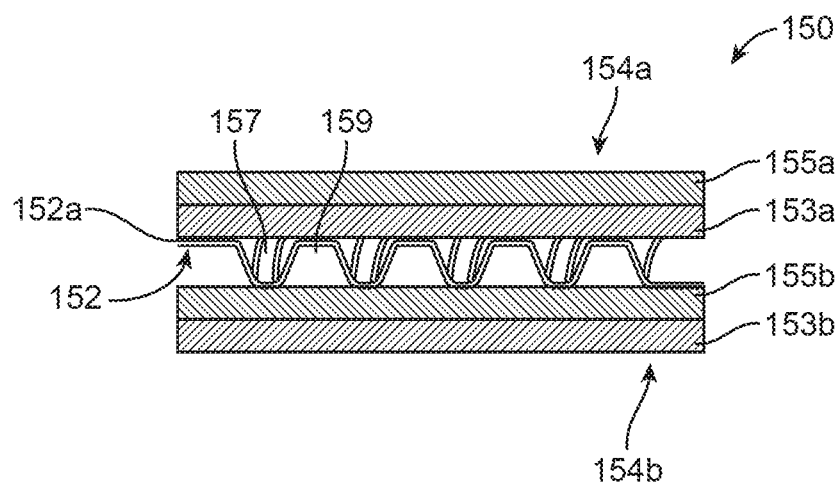
FIG. 1B is a schematic illustration of a fuel cell unit which may be included in the fuel cell stack of FIG. 1A, according to an embodiment.

FIG. 1A is a cross-sectional perspective view of a portion of a fuel cell stack 110, according to an embodiment. The fuel cell stack 110 includes a stack of a plurality of fuel cell units 150, and more specifically, hermetically sealed fuel cell units 110, according to an embodiment. The fuel cell stack 110 includes a plurality of solid oxide fuel cell units 150 alternating with a plurality of interconnects 152. For example, FIG. 1B shows a schematic illustration of a fuel cell unit 150, which may be included in the fuel cell stack 110. Each fuel cell unit 150 includes a first electrochemical cell 110. Each fuel cell unit 150 includes a first electrochemical cell 154a including a first fuel electrode 153a (e.g., an anode), a first oxidant electrode 155a (e.g., a cathode) and may include an electrolyte interposed between the first fuel electrode 153a and the first oxidant electrode 155a. The second electrochemical cell 154b also comprises a second fuel electrode 153b, a second oxidant electrode 155b, and may also include an electrolyte interposed between the second fuel electrode 153a and the second oxidant electrode 155a. In some embodiments, each of the anodes optionally include an anode support. In some embodiments, the fuel cell stack 110 may be operated for reverse flow, i.e., as an electrolysis cell stack. In such embodiments, the fuel electrodes 153a/b of the electrochemical cells 154a/b may include a cathode, and the oxidant electrode 155a/b of the electrochemical cells 154a/b may include an anode.

An interconnect 152 is interposed between the first electrochemical cell 154a and the second electrochemical cell 154b. The interconnect 152 comprises an interconnect main body 152a defining a longitudinal channel 120 along a longitudinal axis thereof (e.g., a longitudinal axis of the fuel cell stack 110 such that the longitudinal channel 120 may span the fuel cell stack 110). The interconnect main body 152a includes a plurality of corrugations defining a plurality of fuel channels 157 on a first surface of the interconnect main body 152a facing the first electrochemical cell 154a, and a plurality of oxidant channels 159 on a second surface of interconnect main body facing the second electrochemical cell 154b. Each of the plurality of fuel channels 157 and the plurality of oxidant channel 159 may be positioned around the longitudinal channel 120, for example, symmetrically and/or in an annular configuration. A fuel channel base of each of the plurality of fuel channels 157 may electrically contact the second oxidant electrode 155b, and an oxidant channel base of each of the plurality of oxidant channels 159 may electrically contact the first fuel electrode 153a.

For example, the electrochemical cells 154a/b and the interconnects 152 are shaped such that, when the fuel cell stack 110 is formed, the longitudinal channel 120 extends longitudinally through the fuel cell stack 110. In the embodiment of FIG. 1A, the electrochemical cells 154a/b and interconnects 152 have an annular shape, and the longitudinal channel 120 is a central channel located at an axial center of the fuel cell stack 110. While described as having an annular shape, the fuel cell stack 110 may have any other suitable shape, for example, ovular, hexagonal, square or off-square, or any other shape, as long as a longitudinal channel 120 extends longitudinally through the fuel cell stack 110. Further, while the longitudinal channel 120 is described as extending along a geometric center of the fuel cell stack 110, in other embodiments, the longitudinal channel 120 may be offset from the geometric center of the fuel cell stack 110 as long as the longitudinal channel 120 does not overlap with outer edges of the fuel cell stack 110.

The electrochemical cells 154a/b are sealed to each interconnect 152 alternately at the inner and outer periphery, as shown in FIGS. 1A and 1B. This yields a structure that is hermetically sealed, yet compliant at the unit cell level to reduce the possibility of thermal stress buildup.

One gas, either fuel or oxidant is admitted to and extracted from the fuel cell units 150 via the longitudinal channel 120, while the other gas is admitted to and extracted from the fuel cell units 150 at an outer periphery of the fuel cell stack 110. In particular embodiments, fuel is admitted and extracted from the longitudinal channel 120, and the oxidant is admitted and extracted at the outer perimeter of the fuel cell stack 110. The hermetic cell-to-interconnect seals prevents mixing of the gases. For example, as shown in FIG. 1A, an outer seal member 158 may be positioned on an outer perimeter of the interconnect 152 on the first surface proximate to the first electrochemical cell 154a, and an inner seal member 156 may be positioned on an inner perimeter of the interconnect 152 on the second surface proximate to the second electrochemical cell 154b around the longitudinal channel 120. The outer seal member 158 may fluidly seal one of the plurality of fuel channels 157 or the plurality of oxidant channels 159 from a volume outside the outer perimeter of the fuel cell stack 110, and the inner seal member 156 may fluidly seal the other of the plurality of fuel channels 157 or the plurality of oxidant channels 159 from the longitudinal channel 120. Particularly, as shown in FIG. 1A, the outer seal member 158 fluidly seals the fuel channels 157 from the volume outside the outer perimeter, and the inner seal member 156 fluidly seals the oxidant channels 159 from the longitudinal channel 120.

By avoiding leakage that would result in fuel and oxidant mixing and combusting, several advantages are gained, including (i) a reduction in a loss of reactants to the system, (ii) a reduction in the heat load on the stack (and especially in localized heating that can damage stack components), (iii) a reduction in steam formation on the oxidant side, which reduces chromium volatilization and transport, which can be a significant degradation mechanism for the oxidant electrode, and (iv) a reduction in cross leak during heat-up and cool-down which allows lower volumes of protective cover gas to be used.

The fuel cell stack 110 may include, for example, between 20 and 400 fuel cell units 150, limited only by the aspect ratio (height to diameter or width) of the finished stack where too high an aspect ratio can present manufacturing and packaging difficulties. In various embodiments, the aspect ratio may be in a range of 4:1 to 5:1, although shorter stacks may be useful for specific applications and for development purposes. The plurality of fuel cell units 150 may be stacked vertically, with intermediate metallic interconnects 152, into a tower.

Each fuel cell stack has a power range of about 50 W to 20 kW (e.g., 0.5 kW to 20 kW, 1 kW to 15 kW, or 5 kW to 10 kW, inclusive of all ranges and values therebetween), depending on the operating conditions and stack size. In one embodiment, the stack has a power range of about 7 kW. Practical stacks as small as approximately 50 W could be fabricated by reducing the cell count and adjusting the operating conditions.

The fuel cell stack 110 or any other electrochemical cell stack described herein make use of appropriate geometry to improve the ability to thermally control the electrochemical cell stack, while offering a cell design that reduces the mechanical stresses induced during manufacture of the cell and later during stack operation. These two advantages allow thinning of both the interconnect 152 and the cell without compromising their structure.

A thickness of the interconnects 152 may be in a range of 0.05 to 0.7 mm (e.g., in a range of 0.075 to 0.4 mm, or 0.08 mm to 0.15 mm, inclusive of all ranges and values therebetween). A thickness of the electrochemical cell units may be in a range of 0.2 to 0.4 mm. In particular embodiments, the thickness may be in a range of 0.25 to 0.35 mm. Over one year of operation has been demonstrated in a stack of this design that incorporated 0.12 mm interconnects 152 and 0.3 mm cells. This is roughly $1/10^{th}$ the material thickness in the interconnect and ½ the cell thickness used in typical SOFC stack designs. When end plates, a compression system, and all other parts are included that form a complete stack, the proposed stack weight in one embodiment was confirmed at $\sim 1/10^{th}$ of the weight of a conventional stack on a per active area basis.

In other words the material content of the electrochemical cell stack is reduced, and the reduction is significant. The design does not require the use of any exotic materials, and in many areas simplifies the materials requirements relative to a conventional electrochemical cell stack. The compression system may be simplified due to lower loads, as discussed in more detail below. Manifolds may also be simplified due to lower sealing requirements, as also discussed in more detail below. This lowered material content reduces the intrinsic cost of the electrochemical cell stack. While part count per kW goes up, part suitability for automation also increases, due to the use of small parts, fewer different parts per layer, and a lack of large tolerances that require operator intervention. Thus, the cost advantage of the lower material content may outweigh the increased overall part count.

Fuel Inlet/Outlet Seals and Oxidant Inlet/Outlet Seals

The separation of fuel in from fuel out and oxidant in from oxidant out is achieved through floating manifolds that are separate from the stack core and sealed to it via compliant seals that are compressible and allow relative motion between the stack core and the manifolds. This allow stack core to grow and bend due to thermally induced loads independently of the manifolds which prevents or reduces thermally induced mechanical stress in the overall structure thereby protecting the individual components. For example ceramic cells are susceptible to brittle fracture if overly stressed. The compliant seals seal between the inlet and outlet of the same gas stream. In other words, compliant seals separate the fuel inlet and fuel outlet, and the oxidant inlet and oxidant outlet. Preferably, the compliant seals do not seal between fuel and oxidant gas in any location. Compliant high temperature ceramic seals are known to have leaks, such leaks may be acceptable because they do not result in combustion and will have only minor impacts on overall efficiency as long as the leak rate is low (e.g.: below ~5% of total flow). This allows the advantageous use of an external manifold design approach, which offers cost, weight and volume advantages.

The separation of inlet gas from outlet gas around the periphery of the stack is achieved through a sheet metal manifold structure that compresses the compliant seals onto the stack core ("stack core" meaning the assembly of the repeated stack parts—cell, interconnect, seals, as well as the end plates). The metal gas separation components may be coated with a dielectric coating to protect against shorting of the stack to the manifold.

The annular cell design keeps the conduction path from any portion of the heat generating area of the cell to the outer surface of the stack to a minimum, which assists in maintaining thermal control of the stack. FIGS. 2A-2D are top schematic views of fuel cell units 250a/b/c/d according to various embodiments, each showing different possible flow paths of fuel and oxidant gas, based on different combinations of internal and external manifold designs. FIG. 2A depicts a fuel cell unit with a single fuel inlet, a single fuel outlet, a single oxidant inlet, and a single oxidant outlet. FIG. 2B depicts a fuel cell unit with two fuel inlets, two fuel outlets, two oxidant inlets, and two oxidant outlets. FIG. 2C depicts a fuel cell unit with a single fuel inlet, a single fuel outlet, two oxidant inlets, and two oxidant outlets. FIG. 2D depicts a fuel cell unit with two fuel inlets, two fuel outlets, a single oxidant inlet and single oxidant outlet. These examples show possible layouts however the design can be adapted for any number of fuel and air inlets that may be desired for a particular application, for example, to lower the operating pressure drop by having more and shorter flow paths.

For example, the interconnect main body (e.g., the interconnect main body 152a) of the interconnects (e.g., the interconnects 152) included in each of the fuel cell units 250a/b/c may define at least one fuel inlet channel and at least one fluid outlet channel fluidly coupled to each of the plurality of fuel channels (e.g., the fuel channels 157). The interconnect main body may further define at least one oxidant inlet channel and at least one oxidant outlet channel fluidly coupled to each of the plurality of oxidant channels (e.g., the oxidant channels 159). The at least one fuel inlet channel and the at least one fuel outlet channel may be fluidly coupled to the longitudinal channel so as to receive fuel from a first portion of the longitudinal channel and expel spent fuel into a second portion of the longitudinal channel. The outer seal member (e.g., the outer seal member 158) may fluidly seal the plurality of fuel channels from the volume outside the outer perimeter. Furthermore, the at least one oxidant inlet channel and the at least one oxidant outlet channel may be fluidly coupled to the outer perimeter of the interconnect so as to receive oxidant from a first portion, and expel spent oxidant from a second portion of the volume outside the outer perimeter. The inner seal member (e.g., the inner seal member 156) may fluidly seal the plurality of oxidant channels from the longitudinal channel.

Modular Arrays

Figure 3:
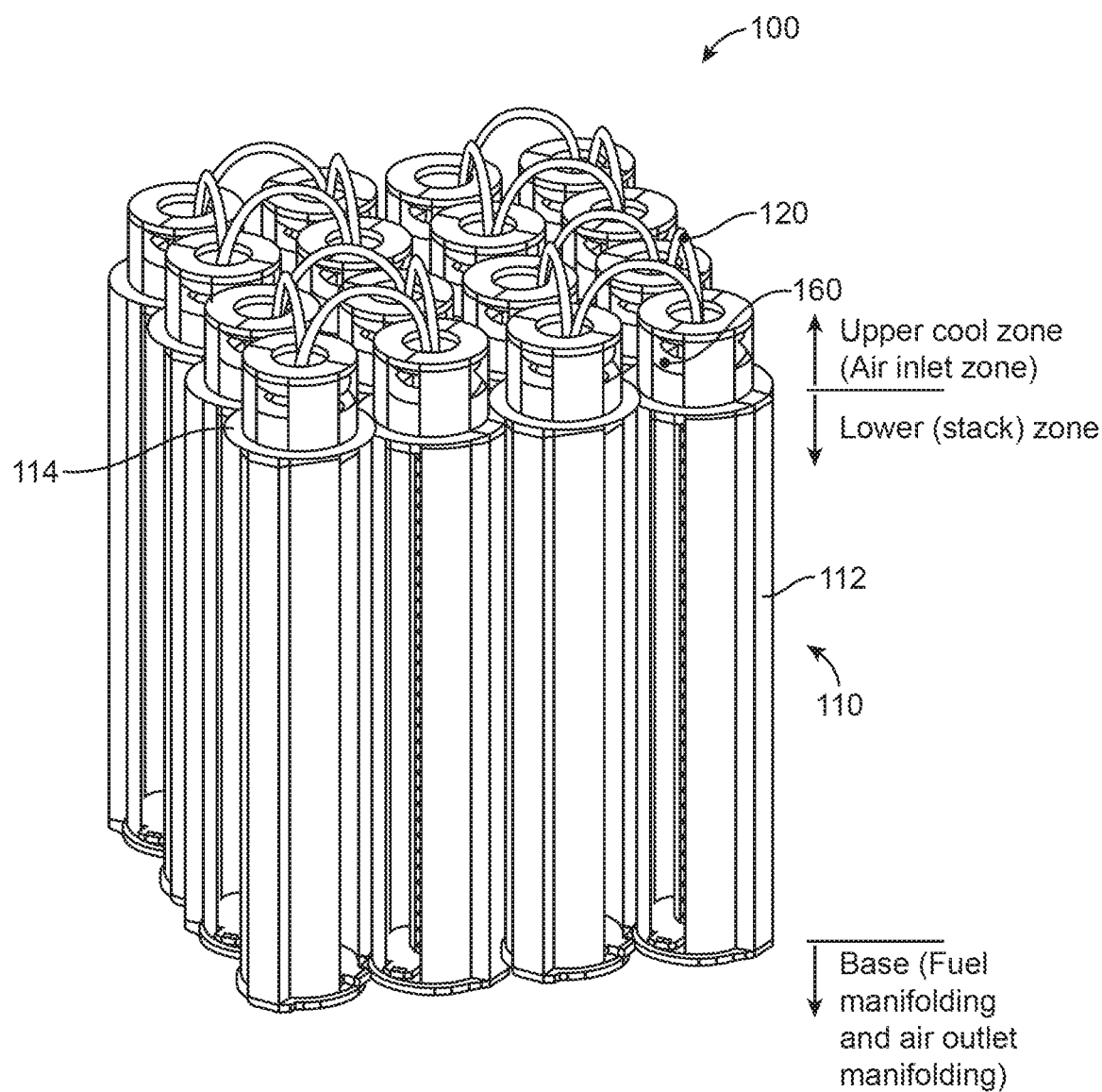
FIG. 3 is a perspective view of an array of fuel cell stacks, according to one embodiment.
Figure 4A:
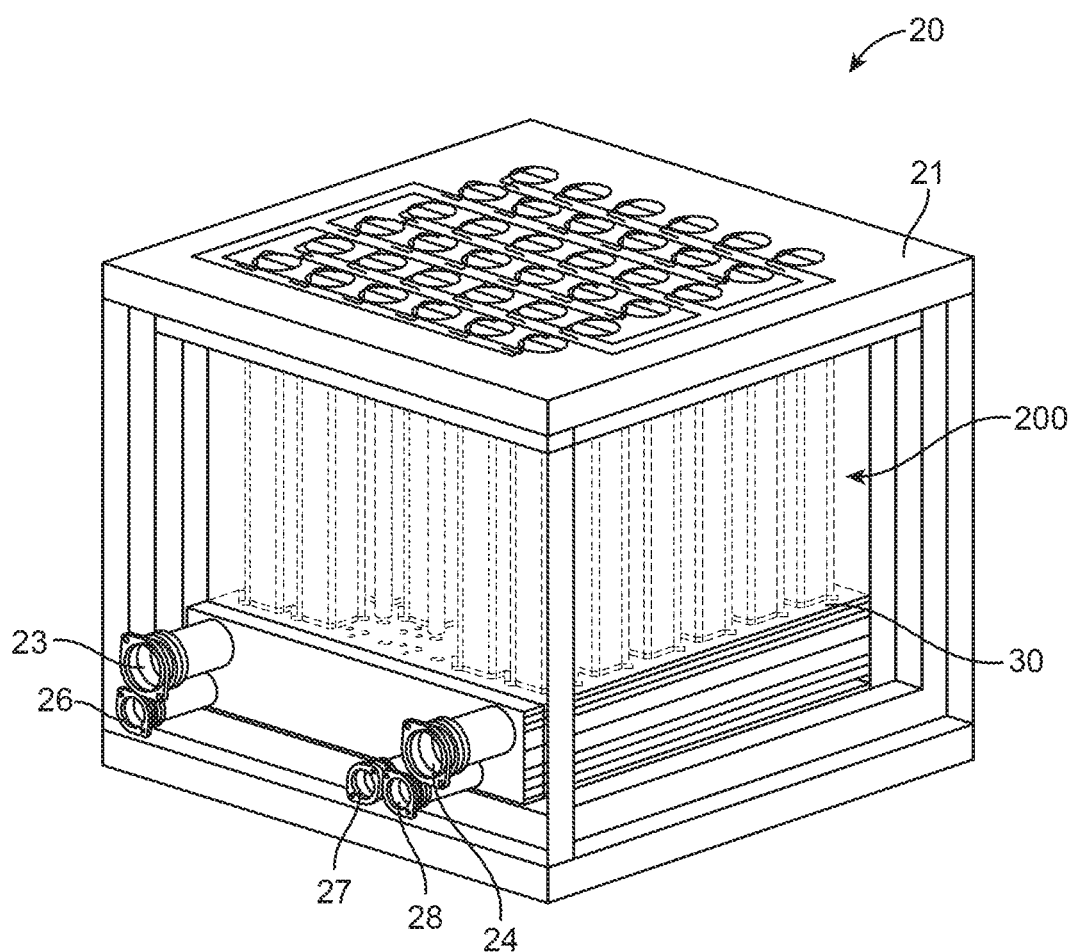
FIGS. 4A and 4B are perspective views of an array of fuel cell stacks, according to two different embodiments.
Figure 4B:
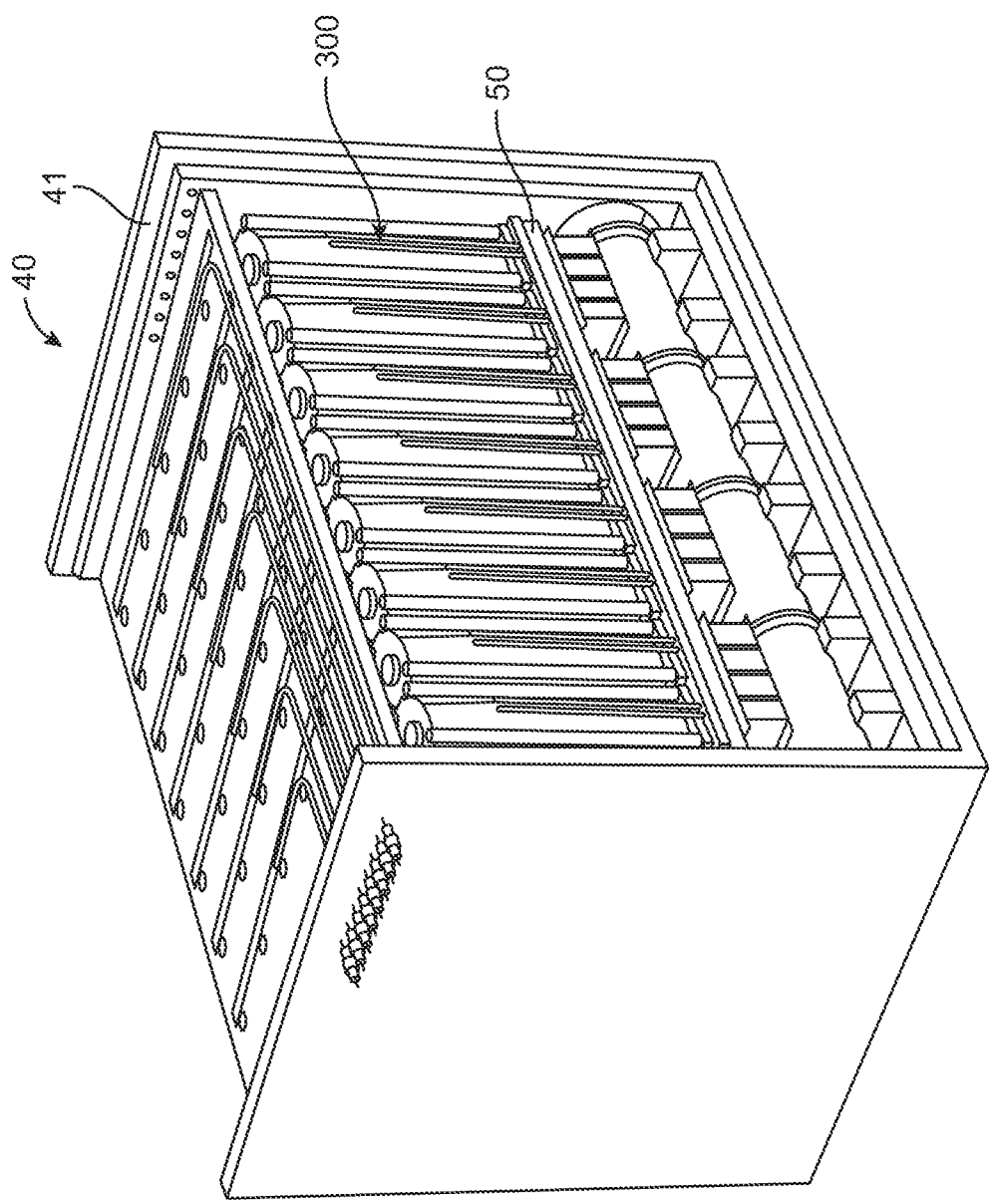

For larger systems stacks would be deployed in modular arrays, for example, deployed in a 20 kW to 250 kW or larger arrays as shown in the array 100 of FIG. 3 or an array 200 shown in FIG. 4A, or in a 40 kW to 500 kW array as shown in array 300 of FIG. 4B. Larger systems may be composed of multiple arrays. The stack design lends itself particularly well to arrayed layouts due to its integrated compression system, direct bolted connection with integrated gas connection, short conduction path to the environment, and high voltage-low current output. By simplifying or eliminating stack-to-module interfaces, the stack has the potential to simplify the design of larger systems. Two embodiments of a stack array based on the stack 110 of FIG. 1A are described below. Stacks may be arrayed into different package sizes depending on the application. Possible sizes range from a single stack (~1.2 kW) to a 15×15 arrays of stacks (250 kW) or larger. As an example, a 10×10, 100 kW package would measure approximately 0.6 m×0.6 m×0.3 m (113 L), including compression, current collection and ducting, which is competitive with internal combustion engines.

FIG. 3 is a perspective view of an array 100 of the fuel cell stacks 110, according to one embodiment. In this embodiment, fuel is fed and extracted from the base of the fuel cell stack 110, while oxidant gas (e.g., air) is admitted into a containing volume above the stack and extracted from the base of the fuel cell stack 110. Air generally has the higher convective heat capacity and so may be used as the primary means of cooling the fuel cell stack 110. The air is admitted above the fuel cell stack 110 (or stack array) at a relatively low temperature, cooling the area above the fuel cell stacks 110. Spring compression and current collection may be integrated into this region, where the cooler temperatures allow the use of less exotic material and/or the use of less material overall while maintaining adequate strength and current carrying capacity.

Stack cooling, a key challenge for large SOFC stacks, may be accomplished by heating the oxidant flow. Unlike direct convective cooling, the multi-staged inlet approach allows much larger temperature increases than would be allowed if the oxidant (e.g., air) was directly admitted to the fuel cell stack 110 core. With proper sizing, inlet temperatures on the order of 200 degrees Celsius (e.g., 150 to 250 degrees Celsius) may be achieved, compared to 600 degrees Celsius for a conventional stack. This large temperature delta allowance enables lower air flows and less preheat load, simplifying and increasing the efficiency of the balance of the components of an electrochemical cell assembly (e.g., a fuel cell assembly or an electrolysis cell assembly) including the array 100.

Each fuel cell stack 110 may be self-contained except for the air inlet ducting and the outer insulation. The packaging solution described herein offers efficiencies by sharing the air inlet and outer insulation shell between multiple fuel cell stacks 110. In some embodiments, a fuel cell assembly (e.g., the fuel cell assembly 20 of FIG. 4A) may include the following repeat units: (1) unit cell (cell+interconnect): ~8 W, ~0.8V; (2) fuel cell stack (several hundred cells+manifolding, compression, etc.): 1200 W, 160 V to 250 V; (3) array (variable, up to 200+ stacks, enclosure, insulation, etc.): ~20 to 250+kW, kV range; and (4) modules (variable, structures of arrays in road transportable sizes): 1 MW+, kV range. In other embodiments, a fuel cell assembly (e.g., the fuel cell assembly 40 of FIG. 4B) may include the following repeat units: (1) unit cell (cell+interconnect): ~20 W, ~0.8 V; (2) stack (several hundred cells+manifolding, compression, etc.): 7,000 W, 160 V to 350 V; (3) 40 to 350+kW, kV range; (4) modules (variable, structures of arrays in road transportable sizes): 1 MW+, kV range.

In larger power implementations (~10 kW and up) a modular approach provides additional benefits. First, stack voltages are high enough that they may be connected in a parallel or series-parallel electrical configuration. This provides automatic load shedding. Any stack whose performance degrades will automatically shed its current load to stacks parallel to it electrically. The complete loss of a stack in a larger multi-stack array would have little negative effect. Second, failed stacks can be replaced without disturbing other stacks, and at a relatively low cost. Where a conventional system with relatively few stacks might require removal and refurbishment of a large and difficult to manage stack in the event of a single weakness, in an array of small stacks local weaknesses can be fixed by replacing only the weak stack, a smaller device and a quicker and lower cost process.

FIGS. 4A and 4B are perspective views of electrochemical cell assemblies including an array of electrochemical cell stacks, according to two different embodiments. These embodiments are similar to the embodiment of FIG. 3, with the exception that all gas services, including inlet air, are fed from the bottom. This decreases the complexity at the top of the stack array, which may bring advantages for initial assembly and for servicing. It also offers advantages in terms of ease of integration into a system, and offers the potential for additional heat transfer between ingoing and outgoing air streams. As described herein, the electrochemical cell assemblies of FIGS. 4A and 4B include fuel cell assemblies having an array of fuel cell stacks. In other embodiments, the electrochemical cell assemblies of FIGS. 4A and 4B may be operated in reverse flow so as to be operated as electrolysis cell assemblies including an array of electrolysis cell stacks.

FIG. 4A shows a fuel cell assembly 20, according to an embodiment. The fuel cell assembly 20 includes a housing 21 having housing base 30. An array 200 of fuel cell stacks (e.g., the fuel cell stacks 110) is disposed on the housing base 30. The array 200 includes a six by six array of fuel cell stacks (40+kW array) with all gas services from the bottom. FIG. 4B shows a fuel cell assembly 40, according to another embodiment. The fuel cell assembly 40 includes a housing 41 having a housing base 50 on which an array 300 of fuel cell stacks (e.g., the fuel cell stacks 110) are positioned. The array 300 includes an eight by five array (280+kw array), with all gas services from the bottom. In these layouts, the housing base 30, 50 incorporates heat exchange functions and distributes and collects gasses evenly to all fuel cell stacks. FIG. 5A is a perspective view of a base portion of the fuel cell assembly 20 shown in FIG. 4A, showing the fuel and oxidant inlets and outlets of the array. Two stacks have been omitted on the left side of FIG. 4A, so that two of the oxidant preheat tubes can be seen.

As shown in FIG. 5A, the electrochemical cell assembly 20 comprises a fuel inlet 22, a fuel outlet 24, an oxidant inlet 26 and an oxidant outlet 28 fluidly coupled to the array 200 of electrochemical cell stacks through the housing base 30. The housing base 30 also defines at least one heat exchange channel 34 configured to provide heat exchange between the fuel entering the housing base 30 through fuel inlet 22 and spent fuel exiting the housing base 30 through the fuel outlet 24. A plurality of stack interfaces 32 (e.g., throughholes) for communicating fuel and oxidant between the array 200 and the housing base 30 and one or more gas distribution channels 36 may also be provided in the housing base 30. Furthermore, a fuel bypass inlet 29 is fluidly coupled to the array 200 of electrochemical cell stacks through the housing base 30 such that the fuel bypass inlet 29 bypasses the at least one heat exchange channel. Thus the fuel inlet 22 and the fuel bypass inlet 29 provide dual fuel inlets, of which the fuel bypass inlet 29 leads straight into the array 200 of fuel cell stacks, and the fuel inlet 22 travels through the heat exchange and reforming sections. These dual inlets are optional, but provide extra controllability of stack inlet temperature and in-stack reforming.

Figure 5B:
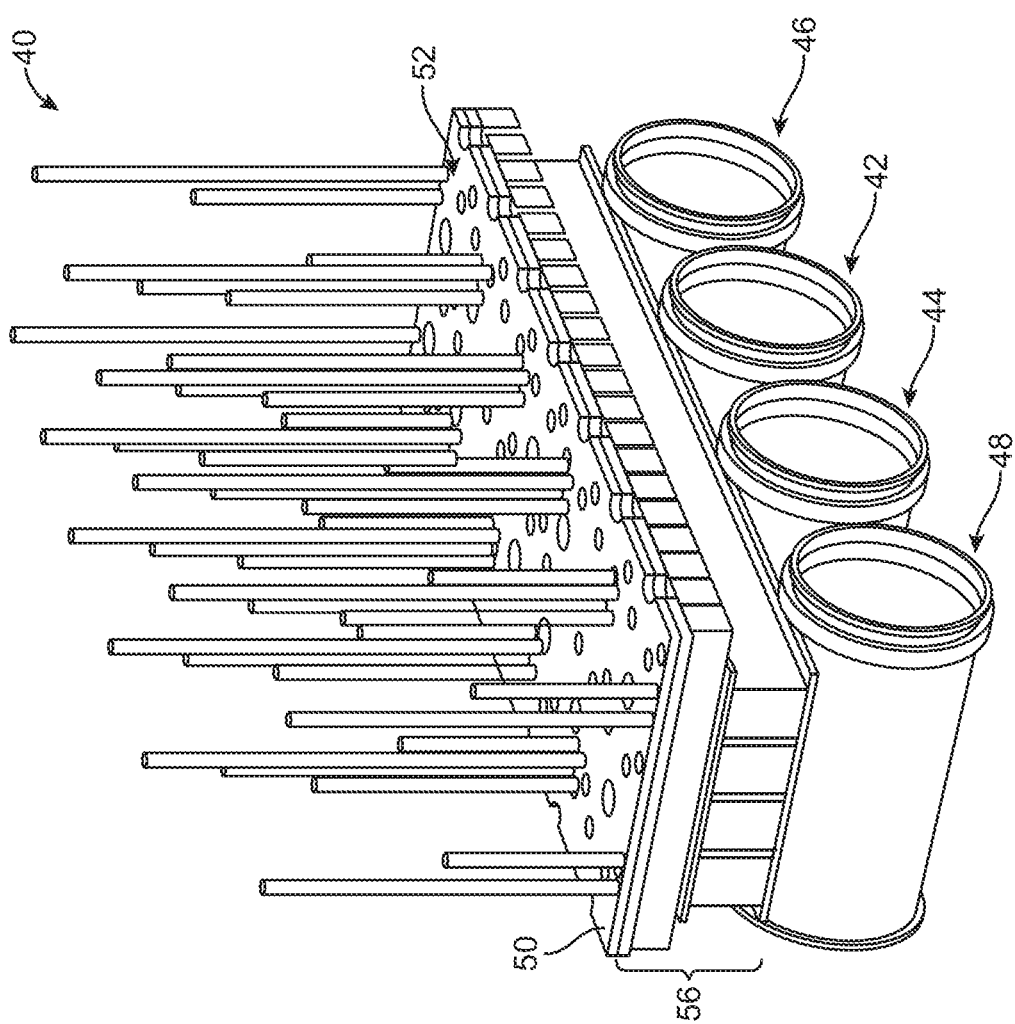

FIG. 5B is a perspective view of a base portion of the fuel cell assembly 40 shown in FIG. 4B, showing a fuel inlet 42, a fuel outlet 44, an oxidant inlet 46 and an oxidant outlet 48 fluidly coupled to the array 300. In these embodiments, the upper portion 56 of the housing base 50 incorporates fuel in to fuel out heat exchange, and may also include fuel reforming sections. A plurality of stack interfaces 52 are also provided in the housing base 50. The fuel cell assembly 40 shown in FIG. 4B does not have dual inlets. In these embodiments, the cold air inlets enter the stack hot zone from the bottom.

Interconnect Design

Figure 6:
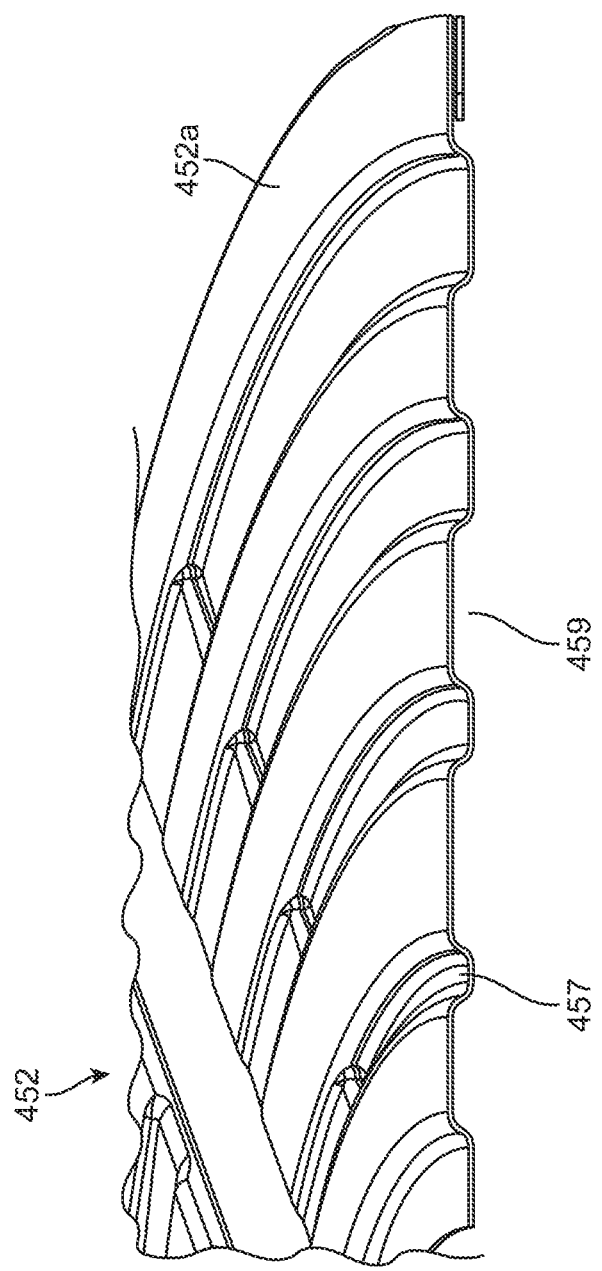
FIG. 6 is a cross-sectional perspective view of an interconnect according to one embodiment.
Figure 7B:
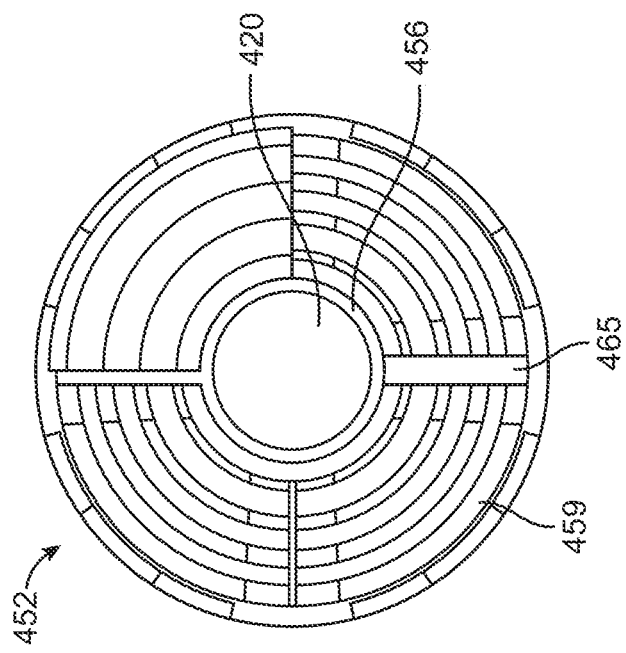
FIGS. 7A and 7B are top and bottom views, respectively, of the interconnect shown in FIG. 6.
Figure 7A:
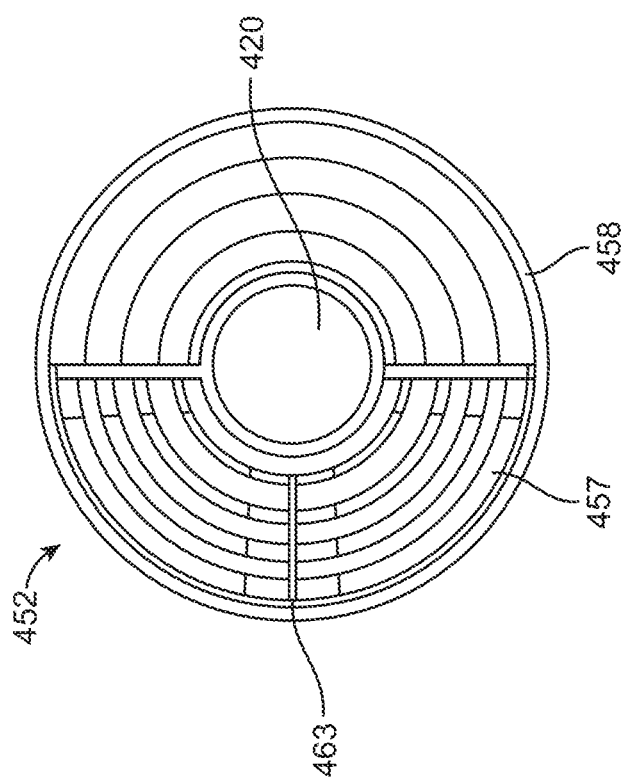

FIG. 6 is a cross-sectional perspective view of an interconnect 452 according to an embodiment. The interconnect 452 includes an interconnect main body 452a defining a plurality of fuel channels 457 and a plurality of oxidant channels 459. In FIG. 6, the fuel side is on the top. The fuel channels 457 simultaneously form the electrical contact areas to the cell oxidant electrode. The oxidant channels 459 simultaneously form the electrical contact areas to the cell fuel electrode. The fuel channels 457 are separated by ribs on the top side of the interconnect 452, while the oxidant channels 459 are separated by ribs on the bottom side of the interconnect 452, i.e., the fuel side ribs form the oxidant channels 459 and vice-versa. FIGS. 7A and 7B are top and bottom views, respectively, of the interconnect 452 shown in FIG. 11 having a longitudinal channel 420 described therethrough at a geometric center thereof. FIG. 7A shows a top, fuel side of the interconnect showing a fuel inlet channel 463 (or fuel outlet channel depending on direction of flow) fluidly coupled to each of the fuel channels 457. FIG. 7B shows a bottom, oxidant side of the interconnect showing an oxidant inlet channel 465 (or an oxidant outlet channel depending on the direction of flow). FIGS. 7A and 7B show the effective active area fed by each channel 457 for the fuel side (FIG. 7A) and 459 oxidant side (FIG. 7B) of the interconnect 452. The flat semi-circular areas overlaid on the interconnect 452 represent the cell active area exposed to each interconnect channel 457, 459. The active areas are each a function of both the position and size and of each channel 457, 459. The interconnect 452 is designed to provide flows down each channel 457, 459 that are in proportion to the active area served by that channel 457, 459. This is accomplished while respecting the size and spacing constraints that provide appropriate current collection from both cell electrodes. Any change to the geometry impacts flow and electrical characteristics of both sides of the interconnect 452. Optionally, contact interlayers may be added between each cell and each interconnect 452, to aid in electrical contact.

In the example shown in FIGS. 7A and 7B, an outer seal member 458 is, in this example, a fuel seal member, which is on the outer perimeter (FIG. 7A). An inner seal member 456 is, in this example, an oxidant seal member, which is on the inner perimeter (FIG. 7B) around the longitudinal channel 420 of the fuel cell stack. The separation of the fuel seal member from the oxidant seal member in space and the corrugated interconnect design provide the necessary compliance without adding to the perimeter or thickness of the stack. Of course, in embodiments in which the oxidant flows through the longitudinal channel 420, the inner seal member 456 will act as a fuel seal, while the outer seal member 458 will act as an oxidant seal.

The base material for the interconnect 452 is on the order of 0.1 mm thick (e.g., 0.07 to 0.13 mm thick). This is possible because the active area of the cell is low, and because the distance from any point on the cell to the edge is relatively small, which leads to the stack temperature being well controlled. For larger stacks, or where distances are larger, the interconnect thickness must increase in order to have enough thermal conductivity to maintain control of the stack and cell temperatures.

Internal Seal Design

Figure 8:
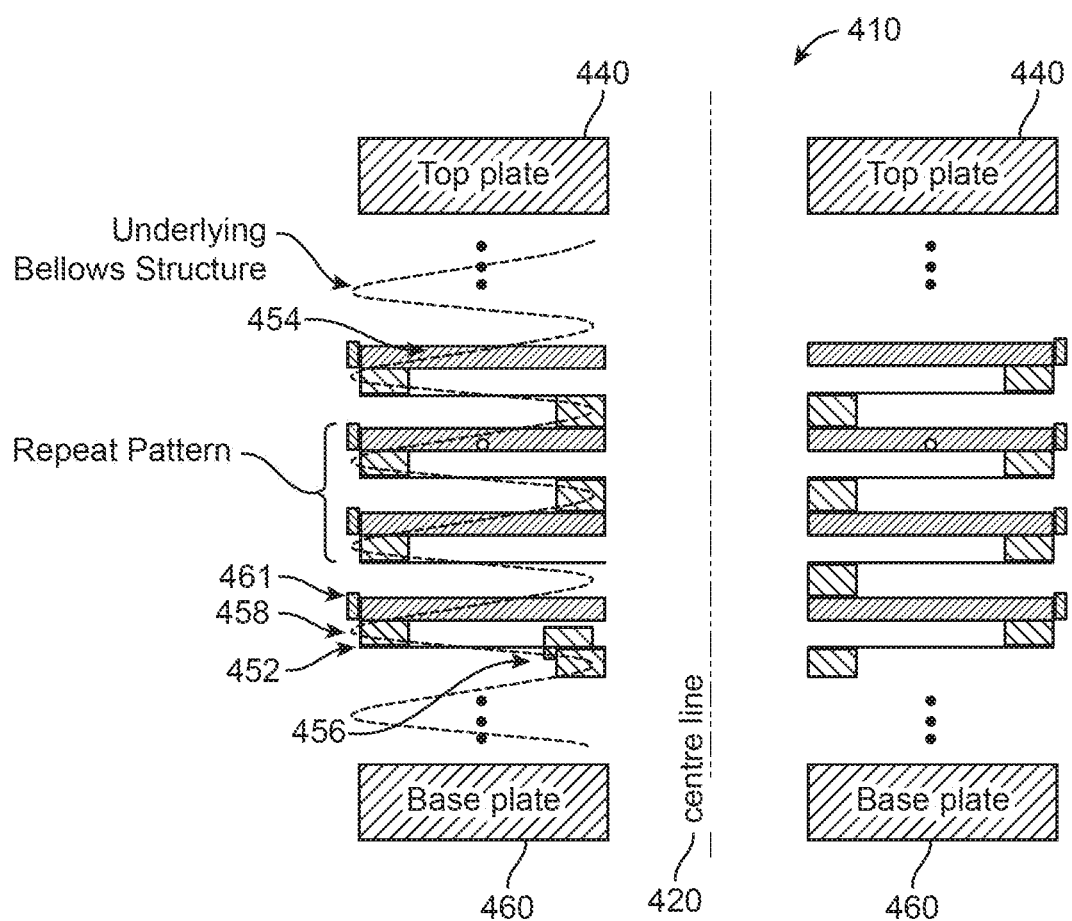
FIG. 8 is a schematic cross-sectional view of a fuel cell stack having a bellows-like structure, according to one embodiment.

The internal seals, those that are between the interconnect 452 and cells, and which separate fuel gas from oxidant gas, may be implemented as glass ceramic seals in the electrochemical cell stacks included in the array 100, 200 or 300. Their position may alternate between the inner diameter and outer diameter in a way that generates a bellows-like structure, which can be seen in the schematic cross-sectional view of FIG. 8 which shows a schematic illustration of an electrochemical cell stack comprising a fuel cell stack 410 which includes the interconnect 452 and is compressed between a top plate 440 and a bottom plate 460. In other words, the plurality of interconnects 452 included in the fuel cell stack 410 cooperatively form a bellows like structure such that the fuel cell stack 410 has compliance. The interconnect 452 may be on the order of 0.1 mm thick. The thin material coupled with the corrugations that generate the flow field make an interconnect 452 that readily relieves stress within that layer. This generates a robust structure where stress is prevented from building up layer to layer. As shown in FIG. 8, it is preferably that no additional separators or metal components are used in order to provide the stress relieving functionality. That is, the bellows-like structure of the fuel cell stack 410 is made of alternating a cell 454, an outer seal 458, an interconnect 452, and an inner seal 456.

In addition to the inner seal 456 and the outer seal 458 an edge seal member 461 may be disposed on at least one of an outer edge of the electrochemical cells 454 (e.g., each of a first electrochemical cell and the second electrochemical cell included in an electrochemical cell unit, e.g., a fuel cell unit or an electrolysis cell unit) proximate to the outer perimeter of the interconnect 452 or an inner edge of the electrochemical cells 454 proximate to the longitudinal channel 420. For example, the edge of the cell anode support is typically porous. In the embodiment shown in FIG. 8, the edge seal member 461 is disposed on an outer edge of the electrochemical cells 454 so as to provide additional sealing between the fuel gas and oxidant gas.

Post Design

As a manifold for gas (either fuel or oxidant) passing through the longitudinal channel to the electrochemical cells, a post may be used. The post may be located in the longitudinal channel, and configured to separate the gas inlet into the electrochemical cells from the longitudinal channel from the gas outlet from the electrochemical cells into the longitudinal channel. The post may be sealed in place with a ceramic slurry, paste, batting, or combination thereof to provide compliant sealing between the inlet and outlet streams. The post may be a machined metal, multi-part sheet metal, a brazement, or ceramic with features that form a vertical channel into which a compliant seal material is added.

Figure 9A:
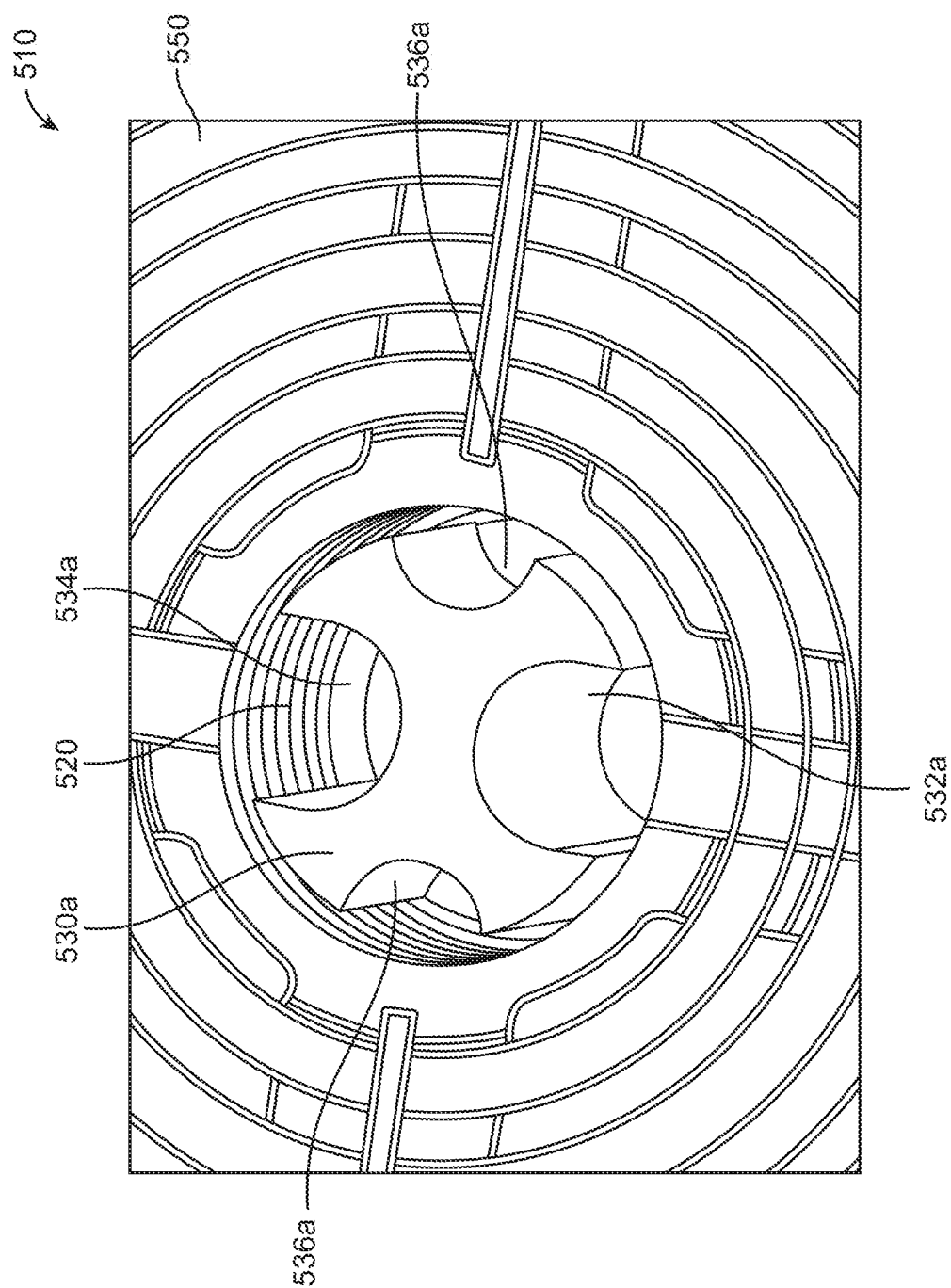
FIGS. 9A-9C are top cross sectional views of a portion of a fuel cell stack, showing a post located in a longitudinal channel of the stack, according to three different embodiments.
Figure 9B:
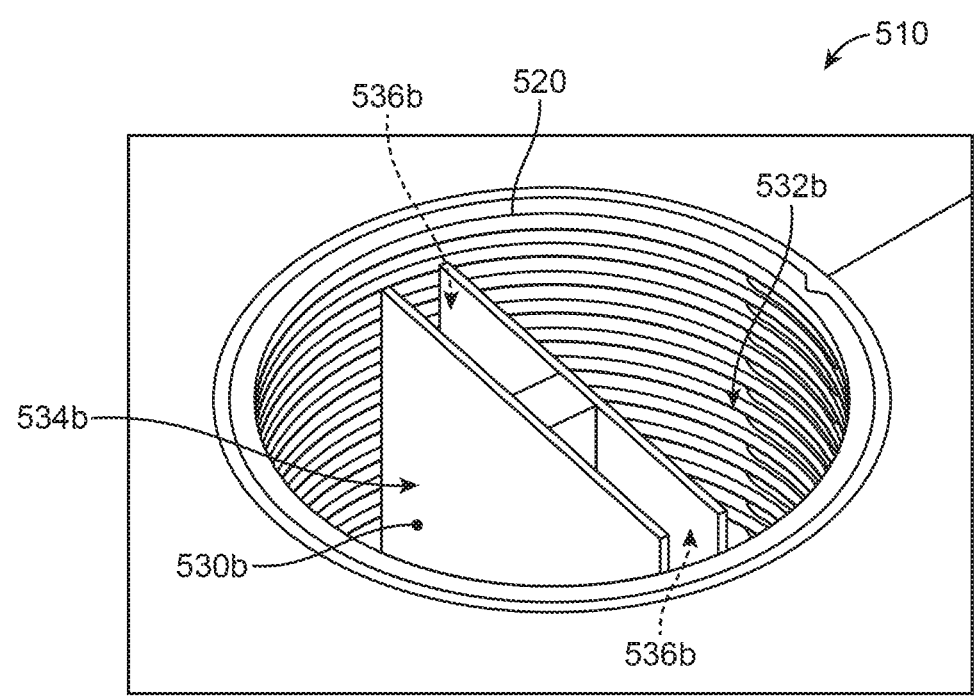
Figure 9C:
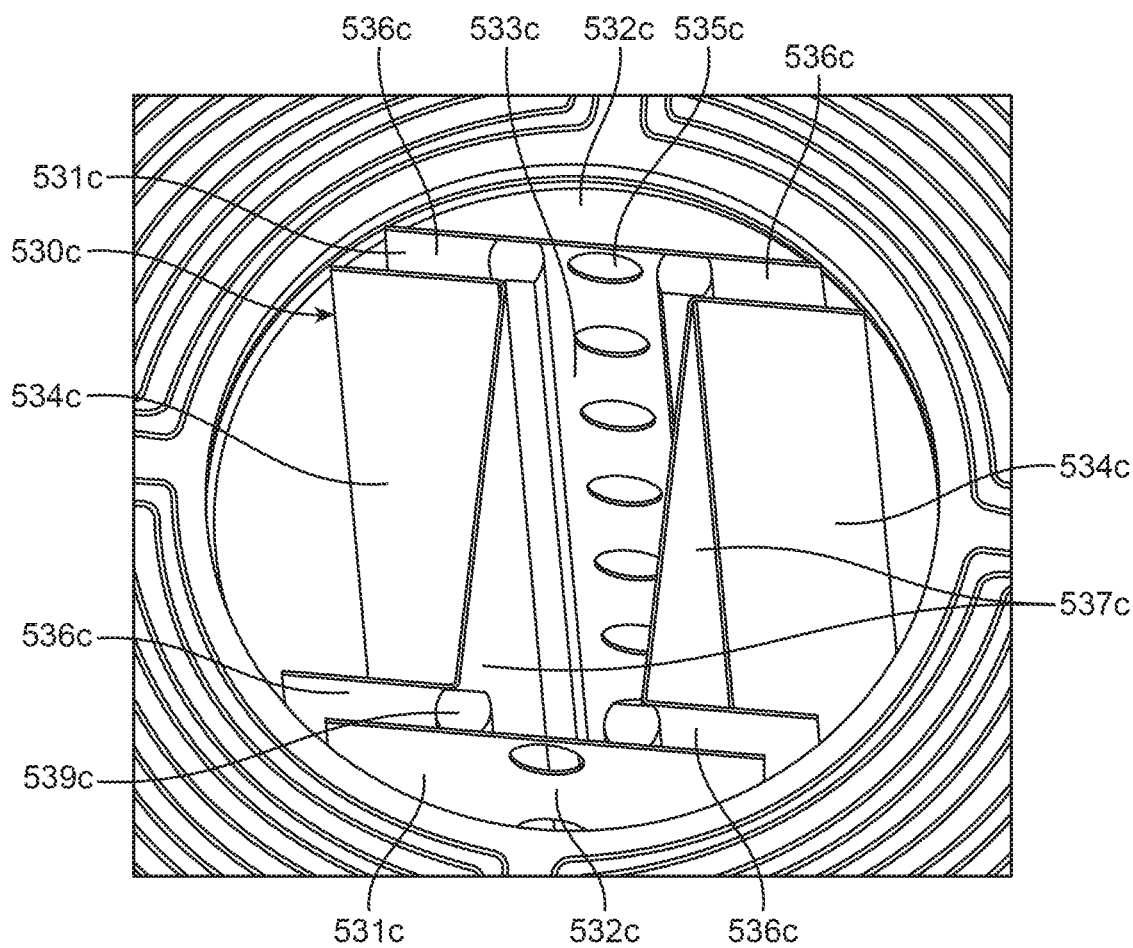

FIGS. 9A-9C are top cross sectional views of a portion of a fuel cell stack 510, showing various posts located in a longitudinal channel 520 of the stack 510, according to three different embodiments. In these embodiments, the longitudinal channel 520 is a central channel extending along an axial center of the stack 510, and thus the post within the channel is termed a "center post." However, in other embodiments, the post may be located in a channel that is offset from a center of the stack 510. In this embodiment it is also assumed that fuel gas passes through the longitudinal channel 420. FIG. 9A shows a circular post 530a according to one embodiment. The post 530 defines deep grooves axisymmetrically located on a periphery thereof so as to define a post inlet 532a configured to receive fuel and a post outlet 534a configured to receive and expel spent fuel the electrochemical cell stack 510. The post inlet 532a and the post outlet 534a are fluidly isolated from each other via seal cavities 536a. FIG. 9B shows a post 530b according to another embodiment disposed in the longitudinal channel 520. The post 530b comprises two parallel plates that divide the longitudinal channel 520 into a post inlet 532b, a post outlet 534b, and seal cavities 536 fluidly isolating the post inlet 532b from the post outlet 534b. In the embodiments of FIGS. 9A and 9B, the post 530a/b which are center posts include one fuel inlet port and one fuel outlet port.

FIG. 9C shows a post assembly 530c including two fuel inlet plates 531c positioned opposite each other. Two fuel outlet plates 537c are positioned perpendicular to the fuel inlet plates 531c so as to define two post outlets 534c opposite each other. In the embodiment of FIG. 9C, the post 534c includes a central channel 533c, for example, a fuel inlet port that is separated from two side post channels 532c (e.g., side fuel ports) by the fuel inlet plates 531c having a plurality of openings 535c. Fuel flows into the central channel 533c and then flows into the side post channels 532c via the openings 535c. The center post assembly 530c of this embodiment has two post outlets 534c which include fuel outlet ports. A sealing member 539c, such as a ceramic caulking material, is inserted into seal cavities 536c to separate inlet fuel from outlet fuel. This seal need not be hermetic, because the leak path does not result in combining fuel and air. Rather, the impact of a leak past this seal is to reduce the fuel flow through the stack itself. A moderate leak, up to a couple percent of total flow, will not have a significant impact on stack performance. Even moderate leaks may have no noticeable impact on any system characteristics because solid oxide fuel cell systems typically operate with excess fuel in order to sweep reaction products ($H_2O$, $CO_2$, etc.) from the fuel electrode.

The sealing member 539c material used in the post 530c may be designed to be somewhat compliant in order to allow thermal stresses to dissipate within the structure. As a consequence of the compliance requirement, the sealing member 539c is not rigidly bonded to the cell layers, and it is not hermetic. However it can be designed to be simultaneously compliant and of sufficiently low leakage that fuel will flow preferentially around the interconnect rather than leak through the seal.

Thermal Management

Figure 10:
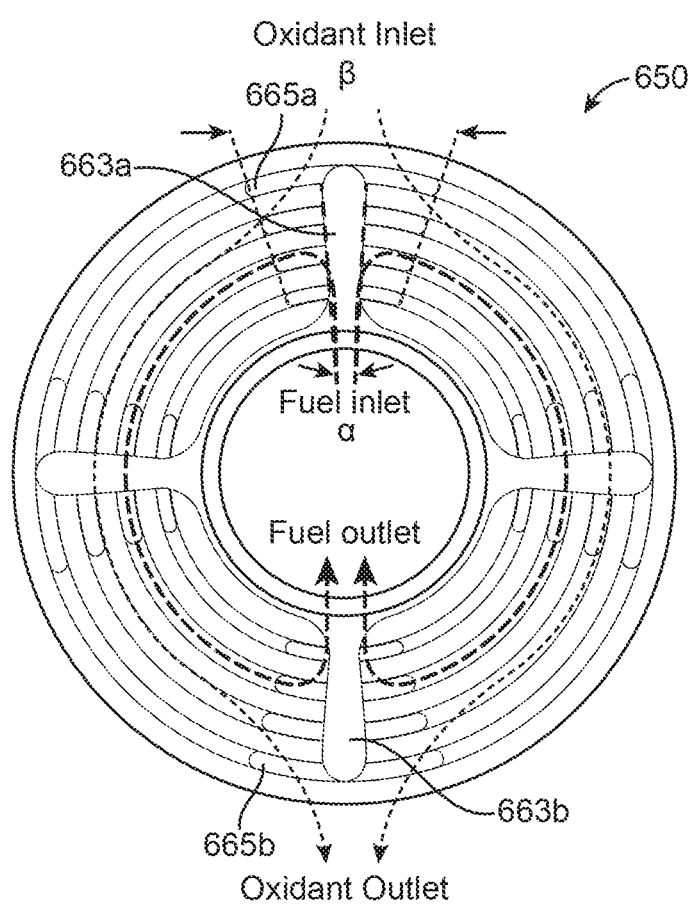
FIG. 10 is a top schematic view of a fuel cell unit and interconnect showing an example of the approximate angle of the fuel inlet ($\alpha$) and oxidant inlet ($\beta$).
Figure 12C:
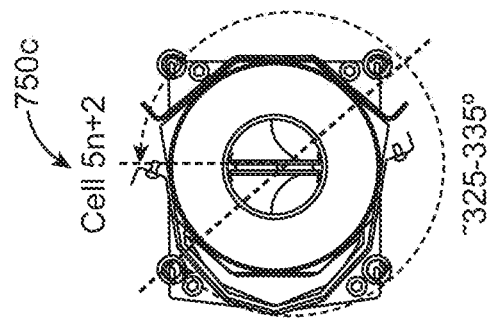
FIGS. 12A-12F show an example of five of the fuel cell units and interconnects shown in FIG. 11, in which all five interconnects are rotationally offset from one another about a longitudinal axis of the fuel cell stack, according to one embodiment.
Figure 12B:
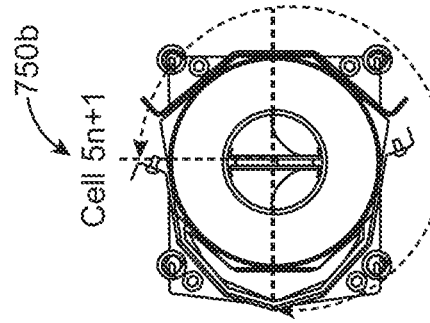
Figure 12E:
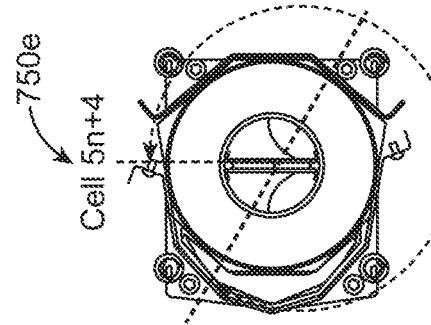
Figure 12A:
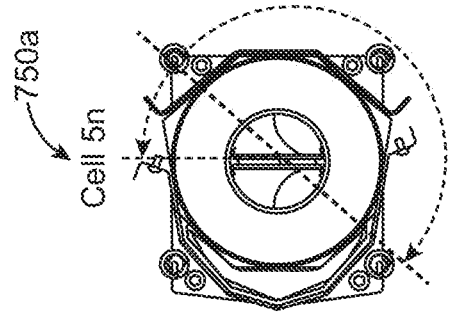
Figure 12D:
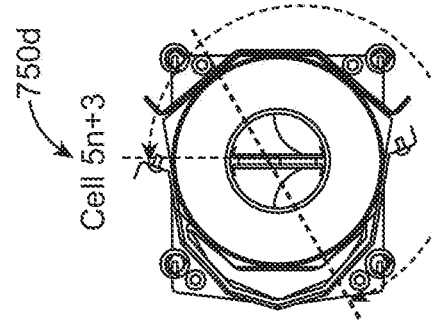

The compact design of the above-described fuel cell stacks imposes relatively higher heat loads (heat per unit volume and unit mass) within the cell and stack and so new strategies for thermal management are desirable. For example, as shown in FIG. 10, a fuel inlet channel 663a may be localized across an arc segment of an electrochemical cell unit 650 that inscribes a first angle $\alpha$ in a range of 2 to 10 degrees. A fuel outlet channel 663b may also inscribe the first angle $\alpha$. In some embodiments, the fuel inlet channel 663a to a cell layer is located across a slice such that the first angle $\alpha$ amounts to approximately 5° of the full cell arc (360°), as is the fuel outlet channel 663b. In some embodiments, an oxidant inlet channel 665a and/or an oxidant outlet channel 665b is located across an arc segment of the electrochemical cell unit 650 that inscribes a second angle $\beta$ in a range of about 15 degrees to 30 degrees. In particular embodiments, the second angle $\beta$ is about 20° of the cell arc.

On the oxidant side, cold air can be flowed to the stack for thermal management, but the majority of the cooling will occur near the inlets, which may account for less than 10% of the total cell area.

On the fuel side, internal reforming can supply additional cooling to the fuel cell stack. In internally reforming fuel cells, a reforming catalyst is placed within the fuel cell stack to allow direct use of hydrocarbon fuels such as pipe line natural gas ($CH_4$), liquefied natural gas (LNG), liquefied petroleum gas (LPG), bio-gas, methane containing coal gas, etc. without the need for expensive and complex external reforming equipment. In an internal reformer, water and heat produced by the fuel cell are used by the reforming reaction, and hydrogen produced by the reforming reaction is used in the fuel cell. The heat produced by the fuel cell reaction supplies heat for the endothermic reforming reaction. Thus, internal reforming is used to cool the fuel cell stack. When direct internal reforming (DIR) is used, the reforming catalyst is located within an active anode compartment of the fuel cell, at the fuel inlet. Reforming is a fast but not an instantaneous reaction. In practice the endotherm imposed by the reforming reaction is concentrated around the fuel inlet to the cell and spreads some flow distance into the cell. The exact distance of penetration and the area of the reforming endotherm vary depending on stack geometry and the operating conditions. In general the reforming endotherm occurs primarily around the fuel inlet and the majority of the cooling effect occurs within the first 2% to 20% of the cell area.

One concept described in this application is to spread the reforming and air inlet endotherms across a larger percentage of the cell area (in the overall stack inlet projections through all fuel cell units) in order to reduce temperature difference across the cell. Reducing the temperature difference across the cell is important for stack robustness (reducing the risk of cell or seal cracking), cell performance (more uniform temperature allows more efficient cell operation) and increased lifetime (preventing hot spots by spreading cooling reduces the localized rates of degradation of the fuel cell unit materials).

FIGS. 11-14 show configurations that can address the above-described problems, according to various embodiments. The general strategy used in these embodiments is to strategically rotate adjacent interconnects within the fuel cell stack. For example, a plurality of electrochemical cell units and interconnects included in a fuel cell stack may include a first fuel cell unit, a first interconnect adjacent the first fuel cell unit, a second fuel cell unit adjacent the first interconnect, and a second interconnect adjacent the second fuel cell unit, the second interconnect being rotationally offset from the first interconnect about a longitudinal axis of the fuel cell stack. This strategy is particularly suited to annular and circular cell designs, but can be used with other shapes where there is periodic rotational symmetry.

Figure 11:
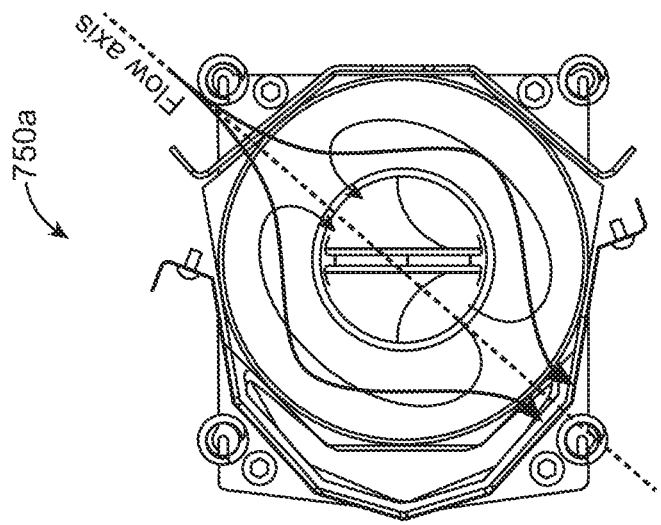
FIG. 11 is a top schematic view of a fuel cell unit showing a flow axis of the fuel cell unit having a single fuel inlet, a single fuel outlet, a single oxidant inlet, and a single oxidant outlet.

FIG. 11 is a top schematic view of a fuel cell unit 750*a* and corresponding interconnect showing a flow axis of the fuel cell unit having a single fuel inlet, a single fuel outlet, a single oxidant inlet, and a single oxidant outlet.

FIGS. 12A-12E show an example of five of the fuel cell units 750*a/b/c/d/e* and corresponding interconnects shown in FIG. 11, in which all five fuel cell units are rotationally offset from one another about a longitudinal axis of the fuel cell stack, according to one embodiment. In various embodiments, a second interconnect (e.g., an interconnect included in the fuel cell unit 750*b*) may be rotationally offset from a first interconnect (e.g., an interconnect included in the fuel cell unit 750*a*) by an angle in a range of 10 to 170 degrees. In the embodiment shown in FIGS. 12A-12E, each interconnect is rotationally offset from both adjacent fuel cell units (e.g., fuel cell unit 750*b* having the fuel cells units 750*a* and 750*c* adjacent thereto) by at least about 60°. Thus, both the fuel inlet channel and the oxidant inlet channel corresponding to each fuel cell unit are likewise rotationally offset from the fuel inlet channel and oxidant inlet channel corresponding to the adjacent fuel cell units by at least about 60°.

It is known that heat distributes relatively well vertically between adjacent cells, with a typical useful transfer across approximately six cells (though this can depend on the details of design and operating conditions). In the embodiment shown in FIGS. 12A-12E, the area of reforming on an arbitrary layer 5*n* (fuel cell unit 750*a*) is in the arc section from about 205° to 215°, on layer 5*n*+1 (fuel cell unit 750*b*) in the area of 265° to 275°, 5*n*+2 (fuel cell unit 750*c*) at 325° to 335°, 5*n*+3 (fuel cell unit 750*c*) at 235° to 245°, and 5*n*+4 (fuel cell unit 750*d*) at 295° to 305°. This pattern would be repeated for every group of five adjacent fuel cell units in the stack. Thus, instead of having all reforming occur within an approximate 10° band vertically through the stack, the reforming endotherm is spread across 130°. The oxidant inlet channels are similarly distributed.

Figure 12F:
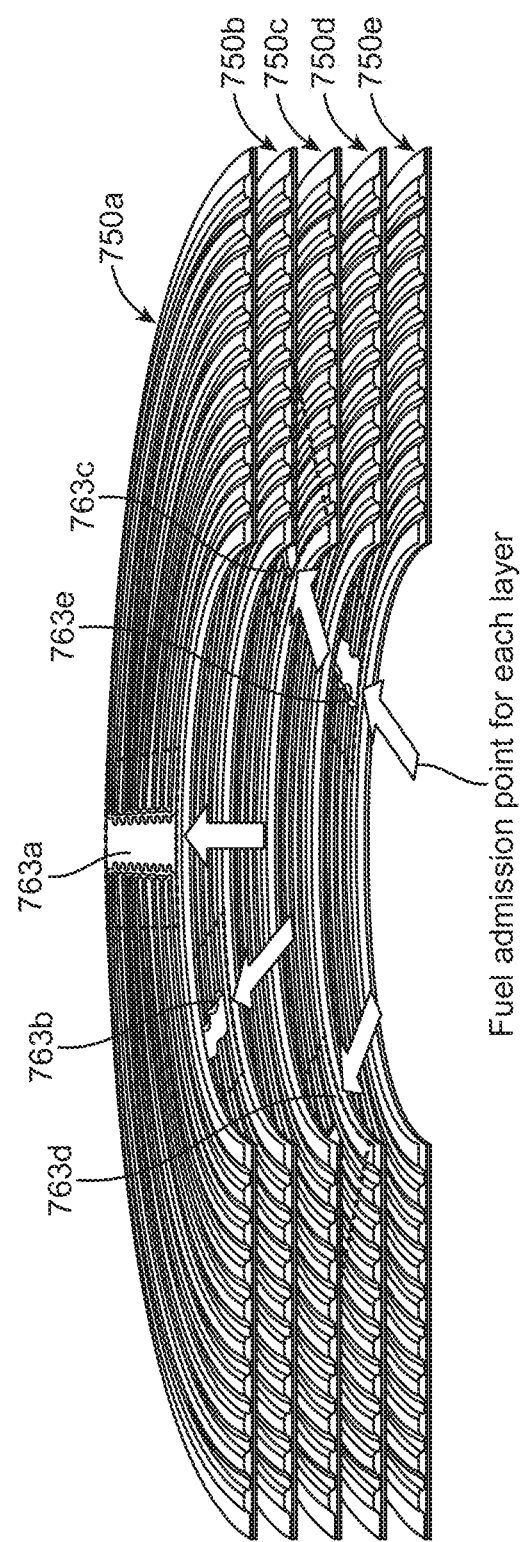

FIG. 12F is a cutaway perspective view showing the fuel inlet channel half of all five of the interconnects of FIGS. 12A-12E. As shown in FIG. 12F, the fuel inlet channels 763*a/b/c/d/e* of each interconnect of the plurality of interconnects included in the fuel cell units 750*a/b/c/d/e* is rotationally offset from the fuel inlet channels 763*a/b/c/d/e* of an adjacent interconnect.

Figure 14:
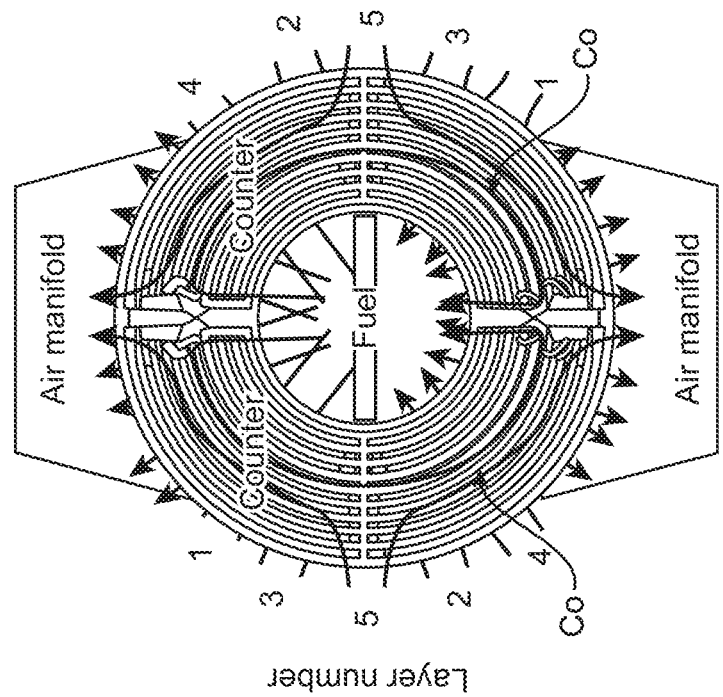
FIG. 14 shows an example of a fuel cell stack having five fuel cell units and corresponding interconnects, each having a single fuel inlet, a single fuel outlet, two oxidant inlets, and two oxidant outlets, in which all five interconnects are rotationally offset from one another about a longitudinal axis of the fuel cell stack, according to one embodiment.
Figure 13:
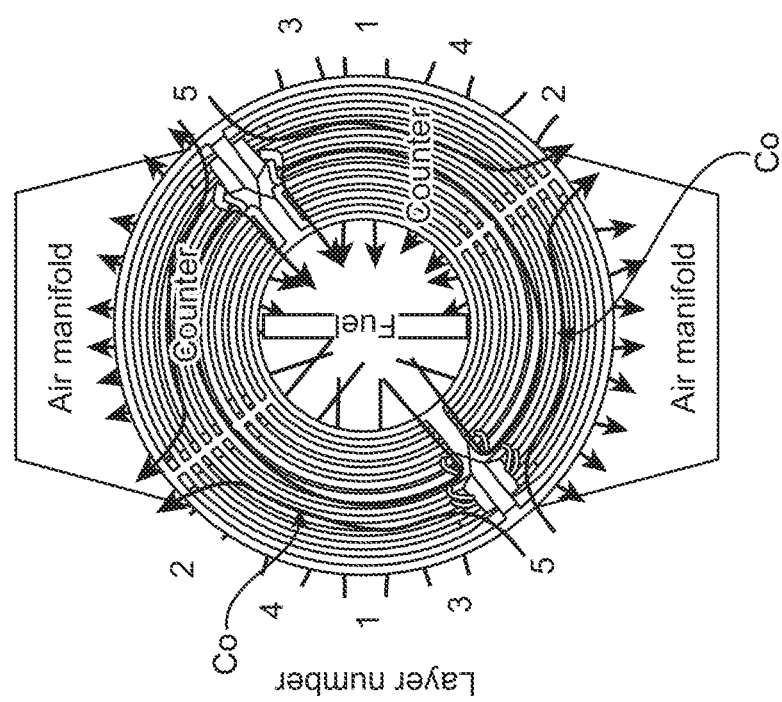
FIG. 13 shows an example of a fuel cell stack having five fuel cell units and corresponding interconnects, each having a single fuel inlet, a single fuel outlet, two oxidant inlets, and two oxidant outlets, in which all five interconnects are rotationally offset from one another about a longitudinal axis of the fuel cell stack, according to one embodiment.

In some embodiments, each of a plurality of interconnects (e.g., the interconnects included in the fuel cell units 750*a/b/c/d/e*) may be rotationally offset along the longitudinal axis in a rotational pattern, the rotational pattern repeating after every group of two to ten interconnects. For example, various embodiments of interconnects are shown in FIGS. 13 and 14. Both of these embodiments have two oxidant inlets (left and right) and two oxidant outlets (top and bottom), as compared to the single inlet—single outlet in the embodiment of FIGS. 11 and 12. In the embodiment of FIG. 13, the fuel inlet and fuel outlet are on the left and right respectively. In the embodiment of FIG. 14, the fuel inlet and fuel outlet are on the top and bottom respectively. Together, FIGS. 12-14 show three different functional implementations of the same concept, each having a periodicity of five (that is, the rotational configuration of the interconnects repeats in every group of five adjacent fuel cell units). However, any periodicity above one will provide heat spreading benefits. For example, the stack may have a rotational pattern or periodicity between two and ten, or between two and eight, or between four and six.

As explained above, embodiments described herein are particularly suited for annular or circular fuel cell units, because this way, the embodiments can be implemented utilizing the same repeat parts (interconnect and fuel cell unit) for each layer. That is, all the fuel cell units within the stack can be identical, and all interconnects can be identical. The stack can be manufactured by rotating each fuel cell unit relative to the last when manufacturing the stack. But in other embodiments, the interconnects may be any other shape and specially manufactured such that an oxidant inlet corresponding to a first fuel cell unit is rotationally offset from an oxidant inlet corresponding to a second, adjacent fuel cell unit about a longitudinal axis of the fuel cell stack, and/or such that a fuel inlet corresponding to a first fuel cell unit is rotationally offset from a fuel inlet corresponding to a second, adjacent fuel cell unit about a longitudinal axis of the fuel cell stack.

Figure 15:
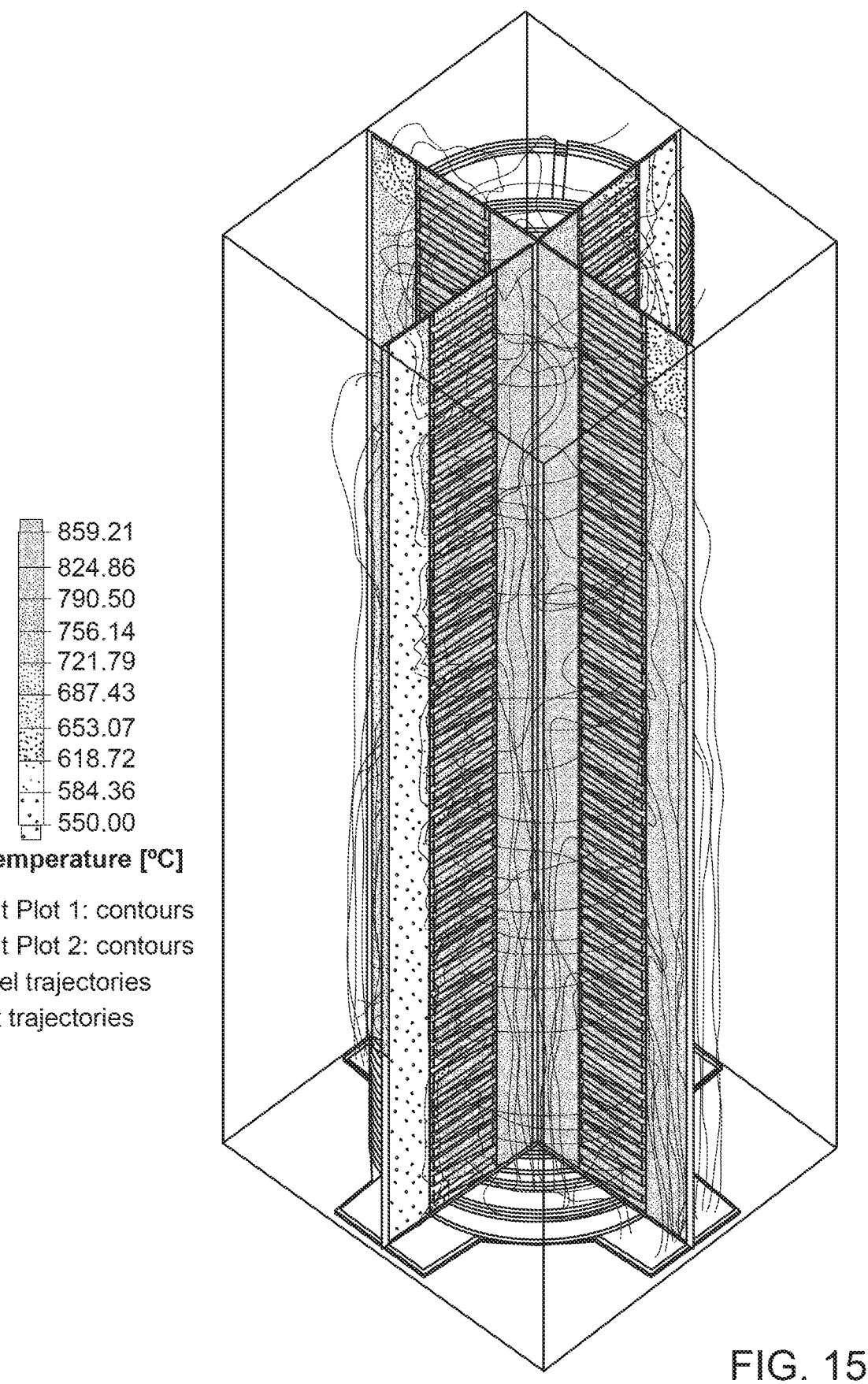
FIG. 15 shows a thermal computational fluid dynamics (CFD) model of a fuel cell stack that includes fuel cell units that are rotationally offset from one another about a longitudinal axis of the fuel cell stack, with a period of five.

FIG. 15 shows a thermal computational fluid dynamics (CFD) model of a fuel cell stack that includes fuel cell units that are rotationally offset from one another about a longitudinal axis of the fuel cell stack, with a period of five. This model shows that the vertical thermal conductivity, coupled with the selectively rotated interconnect strategy, does a good job of evening out the temperature impact of both the reforming and the cold air inlets despite (in this model case) direct impingement of inlet air at approximately 300° C. below stack outlet temperature.

Figure 16:
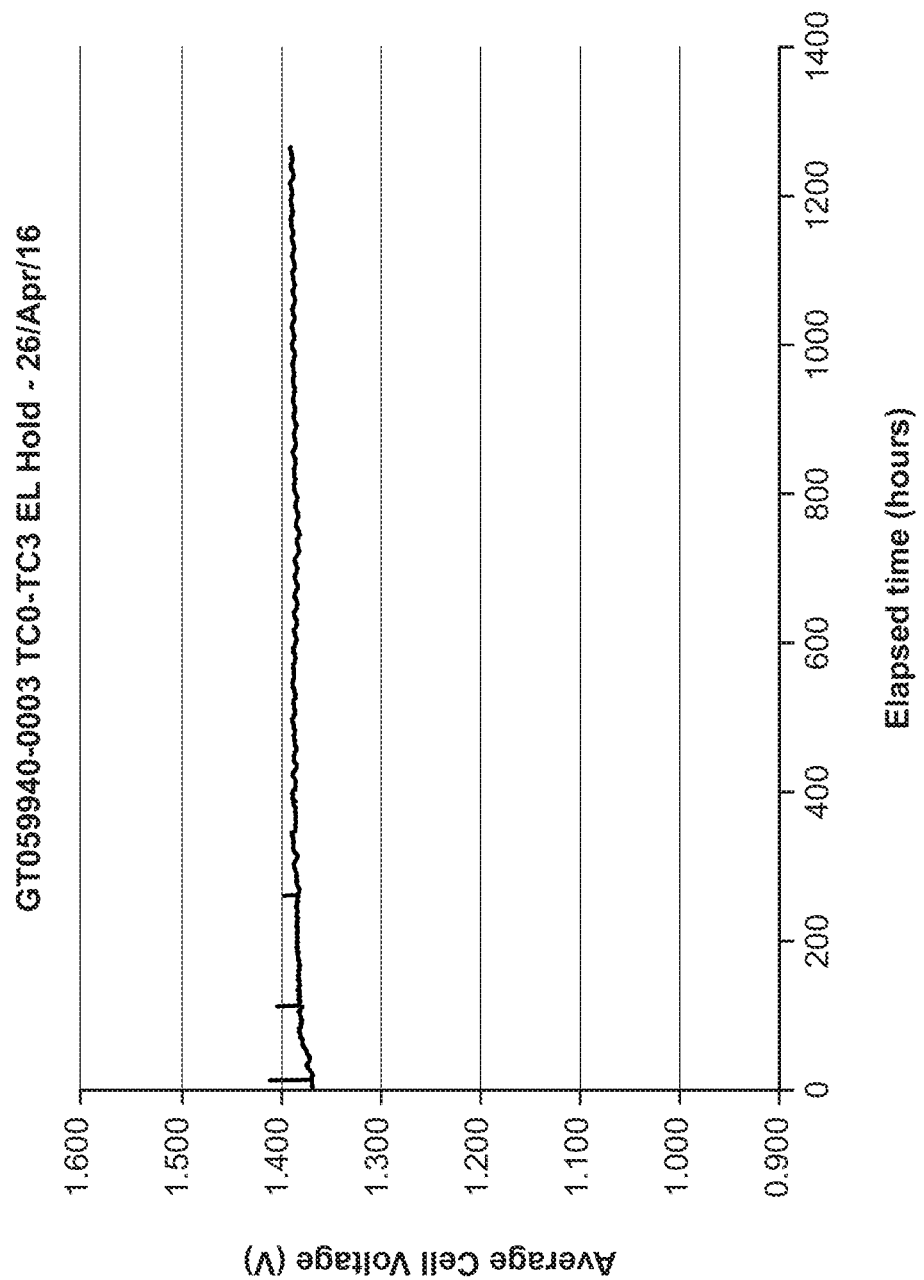
FIG. 16 shows operation of a stack incorporating rotationally offset layers with period 2, operating in electrolysis mode at 2 A/cm$^2$ for over 1200 hours.
Figure 17:
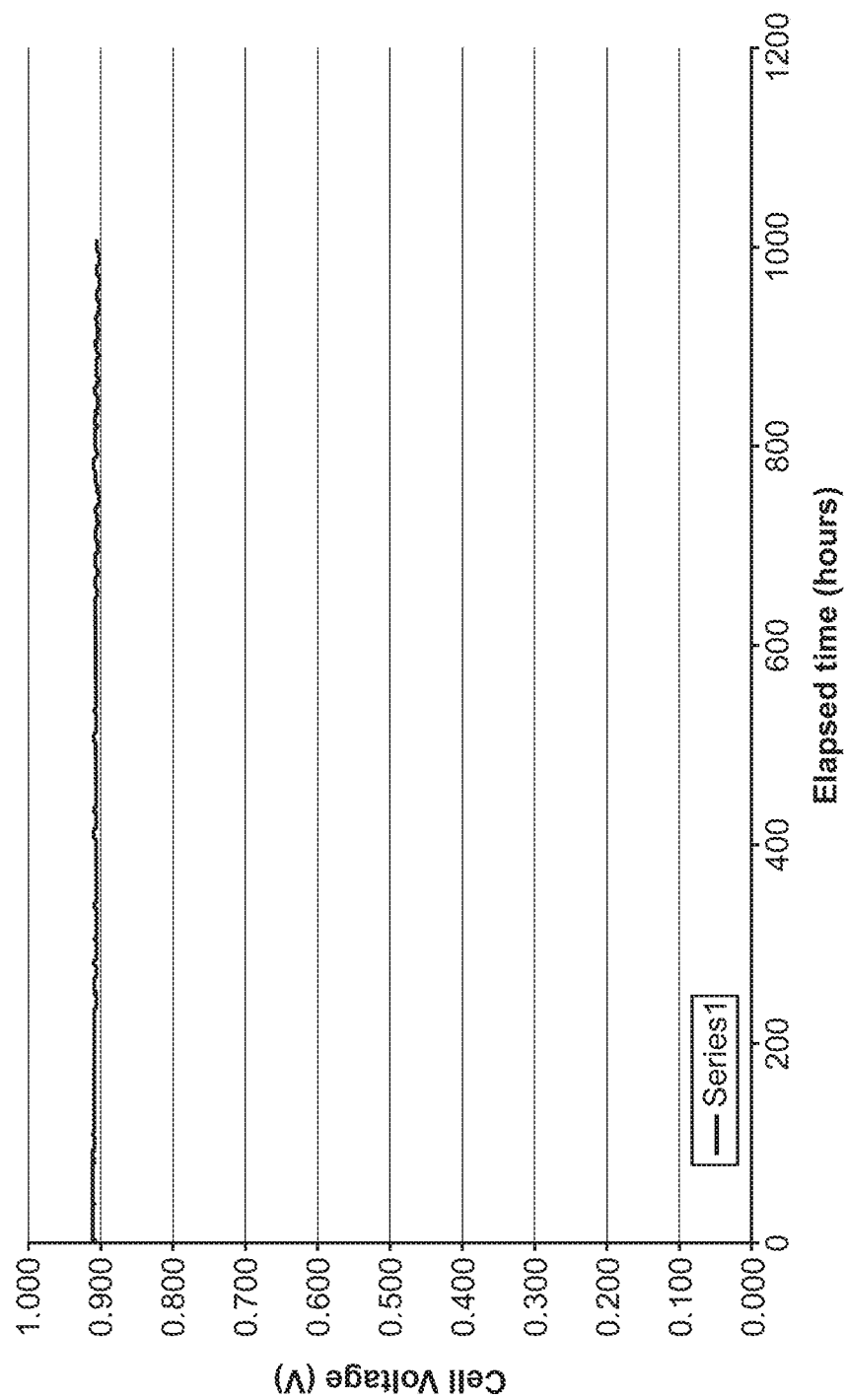
FIG. 17 shows operation of a stack incorporating rotationally offset layers with period 5 operating in fuel cell mode at 0.25 A/cm$^2$ for over 1,000 hours.
Figure 18:
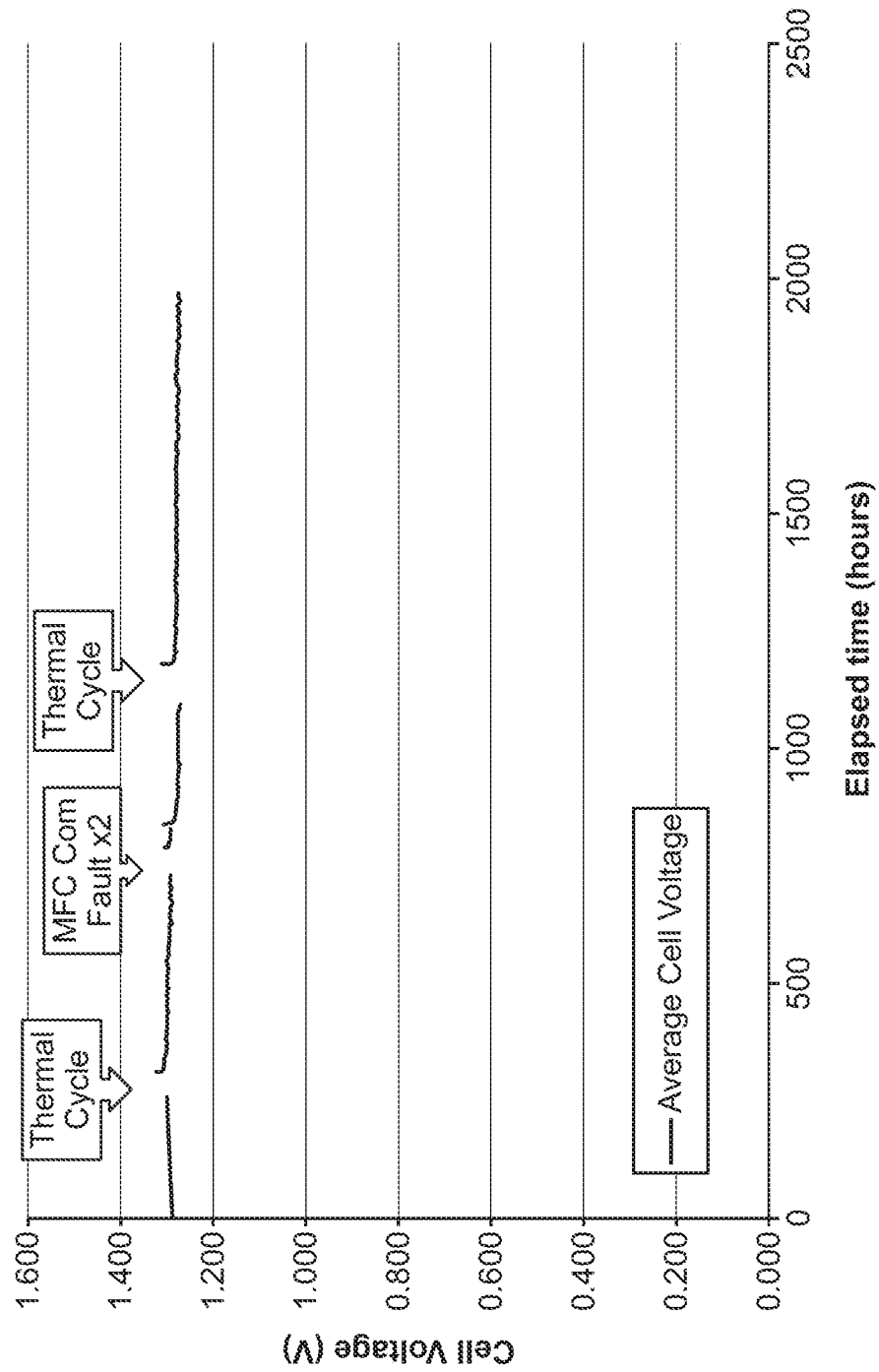
FIG. 18 shows operation of a stack incorporating rotationally offset layers with period 5 operating in electrolysis mode at 1 A/cm$^2$ for over 1,900 hours.

FIG. 16 shows operation of a stack incorporating rotationally offset layers with period 2, operating in electrolysis mode at 2 A/cm$^2$ for over 1200 hours. Not only does this stack have a significantly higher volumetric power density and heat loading than conventional stacks it is also operating at an aggressive and heavily exothermic electrolysis condition. It was able to operate with overall thermal stability due to the integration of the selectively rotated flow fields and resulting smoothing of thermal conditions. FIG. 17 shows operation of a stack incorporating rotationally offset layers with period 5 operating in fuel cell mode at 0.25 A/cm$^2$ for over 1,000 hours, representing thermal loads in the range expected in typical fuel cell applications. The stability and high performance level (high voltage) of this stack show the benefits of the thermal smoothing from selective rotation of flow fields. FIG. 18 shows operation of a stack incorporating rotationally offset layers with period 5 operating in electrolysis mode at 1 A/cm$^2$ for over 1,900 hours. This again shows the stability and high performance achieved in this slightly endothermic operating condition.

In all cases it is understood that the above-described arrangements are merely illustrative of the many possible specific embodiments that represent applications of the present invention. Numerous and varied other arrangements, including different underlying pattern periods, varying pattern periods within a single stack, alternate underlying geometry and flow configuration, can be readily devised in accordance with the principles of the concepts described herein without departing from the spirit and scope of the invention.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the Figures. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention. For example, perforated baffles may be further optimized to achieve the intent of increasing residence time without creating dead zones.

What is claimed is:

1. An electrochemical cell stack comprising:
a plurality of electrochemical cells, each comprising a cathode, an anode, and an electrolyte disposed between the cathode and the anode; and
a plurality of interconnects, each interconnect being disposed between adjacent electrochemical cells;
wherein a longitudinal channel extends through the plurality of electrochemical cells and the plurality of interconnects in a longitudinal axis of the electrochemical cell stack;
wherein each of the plurality of interconnects comprises an interconnect main body and a plurality of corrugations defined circumferentially around the longitudinal channel;
wherein the electrochemical cell stack further comprises a post disposed in the longitudinal channel, the post defining a longitudinal fuel inlet channel and one or more longitudinal fuel outlet channels;
wherein a fuel channel is defined between each anode and a respective adjacent interconnect, the fuel channel having a fuel inlet fluidly coupled to the longitudinal fuel inlet channel and a fuel outlet fluidly coupled to the one or more longitudinal fuel outlet channels;
wherein an oxidant channel is defined between each cathode and a respective adjacent interconnect, the oxidant channel having an oxidant inlet and an oxidant outlet; and
wherein the plurality of electrochemical cells and the plurality of interconnects include a first electrochemical cell, a first interconnect adjacent the first electrochemical cell, a second electrochemical cell adjacent the first interconnect, and a second interconnect adjacent the second electrochemical cell, wherein the fuel inlet corresponding to the second electrochemical cell is rotationally offset from the fuel inlet corresponding to the first electrochemical cell about the longitudinal axis of the electrochemical cell stack.

2. The electrochemical cell stack of claim 1, wherein the second interconnect is rotationally offset from the first interconnect by an angle in a range of 10 degrees to 170 degrees.

3. The electrochemical cell stack of claim 2, wherein the second interconnect is rotationally offset from the first interconnect by an angle of about 60 degrees.

4. The electrochemical cell stack of claim 2, wherein each interconnect of the plurality of interconnects is rotationally offset from an adjacent interconnect by an angle of between 10 degrees and 170 degrees.

5. The electrochemical cell stack of claim 1, wherein each of the plurality of interconnects comprises a fuel inlet channel coupled to the fuel inlet, wherein the fuel inlet channel is located across an arc segment of an adjacent electrochemical cell that inscribes a first angle in a range of between 2 degrees and 10 degrees.

6. The electrochemical cell stack of claim 5, wherein the first angle is about 5 degrees.

7. The electrochemical cell stack of claim 1, wherein each of the plurality of interconnects comprises an oxidant inlet channel coupled to the oxidant inlet, wherein the oxidant inlet channel is located across an arc segment of an adjacent electrochemical cell that inscribes a second angle in a range of between 15 degrees and 30 degrees.

8. The electrochemical cell stack of claim 7, wherein the second angle is about 20 degrees.

9. The electrochemical cell stack of claim 1, wherein each of the plurality of interconnects are rotationally offset along the longitudinal axis in a rotational pattern, the rotational pattern repeating in every group of two to ten interconnects.

10. The electrochemical cell stack of claim 1, wherein the plurality of corrugations define a plurality of fuel channels on a first surface of the interconnect main body facing the first electrochemical cell, and a plurality of oxidant channels on a second surface of the interconnect main body facing the second electrochemical cell, each of the plurality of fuel channels and the plurality of oxidant channels being positioned around the longitudinal channel.

11. The electrochemical cell stack of claim 10, wherein a fuel channel base of each of the plurality of fuel channels electrically contacts an anode of a corresponding second electrochemical cell, and an oxidant channel base of each of the plurality of oxidant channels electrically contacts a cathode of a corresponding first electrochemical cell.

12. The electrochemical cell stack of claim 10, wherein each of the plurality of interconnects comprises a fuel inlet channel, a fuel outlet channel, an oxidant inlet channel and an oxidant outlet channel, wherein each of the fuel inlet channel and fuel outlet channel is fluidly coupled to the fuel channel of a corresponding interconnect of the plurality of interconnects, and each of the oxidant inlet channel and oxidant outlet channel is fluidly coupled to the fuel channel of a corresponding interconnect of the plurality of interconnects.

13. The electrochemical cell stack of claim 1, wherein the plurality of interconnects included in each of the plurality of electrochemical cells cooperatively form a bellows like structure such that the electrochemical cell stack has compliance.

14. A fuel cell stack, comprising:
a plurality of fuel cells, each comprising a cathode, an anode, and an electrolyte disposed between the cathode and the anode;
a plurality of interconnects, each interconnect being disposed between adjacent fuel cells, the plurality of interconnects cooperatively forming a bellows like structure such that the fuel cell stack has compliance;
a longitudinal channel extending through the plurality of fuel cells and the plurality of interconnects in a longitudinal axis of the fuel cell stack;
a post disposed in the longitudinal channel, the post defining a longitudinal fuel inlet channel and one or more longitudinal fuel outlet channels;
a fuel channel defined between each anode and a respective adjacent interconnect, the fuel channel having a fuel inlet fluidly coupled to the longitudinal fuel inlet channel and a fuel outlet fluidly coupled to the one or more longitudinal fuel outlet channels; and
an oxidant channel defined between each cathode and a respective adjacent interconnect, the oxidant channel having an oxidant inlet and an oxidant outlet fluidly coupled,
wherein the plurality of fuel cells and the plurality of interconnects include a first fuel cell, a first interconnect adjacent the first fuel cell, a second fuel cell adjacent the first interconnect, and a second interconnect adjacent the second fuel cell, wherein the oxidant inlet corresponding to the second fuel cell is rotationally offset from the oxidant channel corresponding to the first fuel cell about the longitudinal axis of the fuel cell stack.

15. The fuel cell stack of claim 14, wherein the second interconnect is rotationally offset from the first interconnect by an angle in a range of 10 degrees to 170 degrees.

16. The fuel cell stack of claim 14, wherein each of the plurality of interconnects comprise an interconnect main body defining a longitudinal channel along a longitudinal axis thereof, and a plurality of corrugations defined circumferentially around the longitudinal channel, wherein the plurality of corrugations define a plurality of fuel channels on a first surface of the interconnect main body facing the first fuel cell, and a plurality of oxidant channels on a second surface of the interconnect main body facing the second fuel cell, each of the plurality of fuel channels and the plurality of oxidant channels being positioned around the longitudinal channel.

* * * * *